US011232301B2

(12) United States Patent
Cohen et al.

(10) Patent No.: US 11,232,301 B2
(45) Date of Patent: Jan. 25, 2022

(54) METHOD AND SYSTEM FOR MANAGING A PARKING LOT BASED ON INTELLIGENT IMAGING

(71) Applicant: PARK ASSIST LLC, New York, NY (US)

(72) Inventors: Daniel Cohen, Brooklyn, NY (US); Richard Joffe, New York, NY (US); Bob Caspe, Sherborn, MA (US); Aaron Isaksen, Brooklyn, NY (US); Ilan Goodman, New York, NY (US); Ian Yamey, New York, NY (US); Michael Klevansky, New York, NY (US); Andrew Crawford, Naas (IE); Konstantyn Prokopenko, Brooklyn, NY (US); Steven Hartman, Commack, NY (US); Aurelien Ramondou, New York, NY (US); Mark Kudas, Astoria, NY (US); Ezequiel Cura, New York, NY (US)

(73) Assignee: TKH SECURITY LLC, Cheshire, CT (US)

(*) Notice: Subject to any disclaimer, the term of this patent is extended or adjusted under 35 U.S.C. 154(b) by 0 days.

(21) Appl. No.: 15/406,797

(22) Filed: Jan. 16, 2017

(65) Prior Publication Data
US 2017/0124395 A1 May 4, 2017

Related U.S. Application Data

(62) Division of application No. 13/697,380, filed as application No. PCT/IB2011/052024 on May 8, 2011, now Pat. No. 9,594,956.
(Continued)

(51) Int. Cl.
G06K 9/00 (2006.01)
G07B 15/02 (2011.01)
(Continued)

(52) U.S. Cl.
CPC ......... G06K 9/00624 (2013.01); G07B 15/02 (2013.01); G08G 1/14 (2013.01); G08G 1/142 (2013.01); H04N 7/18 (2013.01)

(58) Field of Classification Search
CPC ...... G06K 9/00624; G07B 15/02; G08G 1/14; H04N 7/18
(Continued)

(56) References Cited

U.S. PATENT DOCUMENTS 6,107,942 A * 8/2000 Yoo ........................ G08G 1/14
340/468
6,142,702 A * 11/2000 Simmons .............. E01F 13/123
340/932.2
(Continued)

FOREIGN PATENT DOCUMENTS

DE 102005005065 A1 8/2006
DE 102004028491 B4 9/2006
(Continued)

OTHER PUBLICATIONS

Memorandum of Points and Authorities in Support of San Diego County Regional Airport Authority's Motion to Dismiss Amended Complaint Under 35 U.S.C. § 101, United States District Court of the Southern District of California, Case No. 3:18-cv-02068-BEN-MDD, filed Nov. 8, 2018.
(Continued)

Primary Examiner — Kaitlin A Retallick
(74) Attorney, Agent, or Firm — Carter, DeLuca & Farrell LLP; David C. Lee

(57) ABSTRACT

To manage a plurality of parking spaces, one or more images are acquired, with each parking space appearing in at least
(Continued)

one image. Periodically acquired images of occupancy and identity are used in directing a customer to a parked vehicle. Periodically acquired images of just occupancy are used in controlling respective environmental aspects, such as illumination and ventilation, of the parking spaces. For these purposes, the images are classified automatically as "vacant" or "occupied", and are displayed along with their classifications so that the classifications can be corrected manually.

12 Claims, 15 Drawing Sheets

Related U.S. Application Data

(60) Provisional application No. 61/332,822, filed on May 10, 2010.

(51) Int. Cl.
*G08G 1/14* (2006.01)
*H04N 7/18* (2006.01)

(58) Field of Classification Search
USPC .......................................... 348/148; 382/104
See application file for complete search history.

(56) References Cited

U.S. PATENT DOCUMENTS

| | | | |
|---|---|---|---|
| 6,426,708 B1* | 7/2002 | Trajkovic | G08G 1/14 340/932.2 |
| 6,493,676 B1* | 12/2002 | Levy | G06Q 30/0284 705/13 |
| 7,271,738 B2 | 9/2007 | Berstis et al. | |
| 7,312,722 B2 | 12/2007 | Tillotson et al. | |
| 7,466,242 B2 | 12/2008 | Berman | |
| 7,619,542 B2 | 11/2009 | Riesco Prieto et al. | |
| 7,667,619 B2 | 2/2010 | Montgomery, Sr. | |
| 7,855,661 B2 | 12/2010 | Ponert | |
| 7,868,784 B2 | 1/2011 | Kuo et al. | |
| 7,893,848 B2 | 2/2011 | Chew | |
| 7,956,769 B1 | 6/2011 | Pearl | |
| 8,059,864 B2 | 11/2011 | Huang et al. | |
| 8,139,155 B2 | 3/2012 | Chen et al. | |
| 8,279,088 B2 | 10/2012 | Khim | |
| 8,280,153 B2 | 10/2012 | Cobb et al. | |
| 8,330,623 B2 | 12/2012 | Kim | |
| 9,275,392 B2 | 3/2016 | Potkonjak | |
| 9,584,710 B2 | 2/2017 | Marman et al. | |
| 2004/0059693 A1* | 3/2004 | Hausen | G06Q 30/0284 705/418 |
| 2004/0138929 A1* | 7/2004 | Awiszus | G06Q 10/02 705/5 |
| 2005/0083432 A1 | 4/2005 | Honda et al. | |
| 2005/0235587 A1* | 10/2005 | Blumberg | E04H 6/10 52/236.3 |
| 2006/0033641 A1 | 2/2006 | Jaupitre et al. | |
| 2006/0045312 A1 | 3/2006 | Bernstein et al. | |
| 2006/0106504 A1 | 5/2006 | Carpenter | |
| 2006/0149684 A1* | 7/2006 | Matsuura | G06Q 20/367 705/65 |
| 2007/0046484 A1 | 3/2007 | Bucholz et al. | |
| 2007/0050240 A1* | 3/2007 | Belani | G08G 1/14 705/13 |
| 2007/0129881 A1 | 6/2007 | Chien | |
| 2007/0210935 A1 | 9/2007 | Yost et al. | |
| 2008/0030373 A1 | 2/2008 | Montgomery | |
| 2008/0144943 A1 | 6/2008 | Gokturk et al. | |
| 2008/0151051 A1* | 6/2008 | Konno | G06K 9/00771 348/143 |
| 2008/0158365 A1* | 7/2008 | Reuter | H04N 5/345 348/207.1 |
| 2008/0258935 A1* | 10/2008 | Lee | G07B 15/02 340/932.2 |
| 2008/0266138 A1 | 10/2008 | Ponert | |
| 2009/0083091 A1* | 3/2009 | Rust | G05B 19/4182 705/7.13 |
| 2009/0085772 A1* | 4/2009 | Huang | G08G 1/14 340/932.2 |
| 2009/0087096 A1 | 4/2009 | Eaton et al. | |
| 2009/0192950 A1* | 7/2009 | King | G06Q 30/0284 705/418 |
| 2009/0248577 A1* | 10/2009 | Hoj | G07B 15/063 705/40 |
| 2009/0273470 A1* | 11/2009 | Sinkevicius | G08B 25/10 340/539.26 |
| 2009/0292597 A1 | 11/2009 | Schwartz et al. | |
| 2009/0303079 A1* | 12/2009 | Khim | G08G 1/065 340/932.2 |
| 2009/0309760 A1* | 12/2009 | Chew | G08G 1/14 340/932.2 |
| 2009/0315738 A1* | 12/2009 | Falk | G08G 1/0175 340/932.2 |
| 2010/0063641 A1 | 3/2010 | Scholten | |
| 2010/0272317 A1 | 10/2010 | Riesco Prieto et al. | |
| 2010/0302933 A1* | 12/2010 | Sreenan | H04L 45/021 370/217 |
| 2010/0309024 A1* | 12/2010 | Mimeault | G08G 1/04 340/932.2 |
| 2011/0063446 A1* | 3/2011 | McMordie | G06K 9/209 348/159 |
| 2011/0068739 A1 | 3/2011 | Smith | |
| 2011/0093314 A1* | 4/2011 | Redmann | G06Q 20/127 705/13 |
| 2011/0099126 A1 | 4/2011 | Belani et al. | |
| 2011/0199077 A1 | 8/2011 | Bergstrom et al. | |
| 2012/0326893 A1* | 12/2012 | Glezerman | G08G 5/025 340/932.2 |

FOREIGN PATENT DOCUMENTS

| | | | |
|---|---|---|---|
| EP | 1331620 B1 | 4/2005 | |
| WO | 2006042981 A1 | 4/2006 | |
| WO | WO 2006106369 A1 * | 10/2006 | ............... G08G 1/14 |
| WO | WO-2006106369 A1 * | 10/2006 | ............... G08G 1/14 |
| WO | 2007027818 A1 | 3/2007 | |
| WO | 2007064168 A1 | 6/2007 | |
| WO | 2008061540 A1 | 5/2008 | |

OTHER PUBLICATIONS

Declaration of Eric M. Acker in Support of San Diego County Regional Airport Authority's Motion to Dismiss Amended Complaint Under 35 U.S.C. § 101, United States District Court of the Southern District of California, Case No. 3:18-cv-02068-BEN-MDD, filed Nov. 8, 2018.
Park Assist's Memorandum in Opposition to San Diego County Regional Airport Authority's and ACE Parking Management, Inc.'s Motion to Dismiss Under 35 U.S.C. § 101, United States District Court of the Southern District of California, Case No. 18-CV-2068-BEN-MDD, filed Nov. 26, 2018.
Reply in Support of San Diego County Regional Airport Authority's Motion to Dismiss Amended Complaint Under 35 U.S.C. § 101, United States District Court of the Southern District of California, Case No. 3:18-cv-02068-BEN-MDD, filed Dec. 3, 2018.
Order Denying Defendants' Motions to Dismiss [Docs. 25, 26], United States District Court of the Southern District of California, filed Aug. 26, 2019.
Tang, et al., "Optimizing One-Shot Recognition with Micro-Set Learning", IEEE (2010), pp. 3027-3034.
Kasaei, et al., "New Morphology-Based Method for Robust Iranian Car Plate Detection and Recognition", International Journal of Computer Theory and Engineering, vol. 2. No. 2, 1793-8201 (2010), pp. 1793-8201.
Shaikh, et al., "Automated Undergound Car Parking Areas", Delft Univertiy of Technology (2010), pp. 1-52.
https://web.archive.org/web/20100411230101/http:/www.parkassist.com/index.html, Oct. 13, 2020.

(56) References Cited

OTHER PUBLICATIONS https://web.archive.org/web/20100413104722/https:/www.parkassist.com/press-more3-camera-system.html, Oct. 13, 2020.
https://web.archive.org/web/20100411193253/http:/www.parkassist.com/products.html, Oct. 13, 2020.
https://web.archive.org/web/20100411193333/http:/www.parkassist.com/solutions.html#guidance, Oct. 13, 2020.
https://web.archive.org/web/20100411193333/http:/www.parkassist.com/solutions.html#enforcement, Oct. 13, 2020.
https://web.archive.org/web/20100411193333/http:/www.parkassist.com/solutions.html#reporting, Oct. 13, 2020.
https://web.archive.org/web/20100411193333/http:/www.parkassist.com/solutions.html#lpr, Oct. 13, 2020.
https://web.archive.org/web/20100411223329/http:/www.parkassist.com/contact.html, Oct. 13, 2020.
https://web.archive.org/web/20100413104722/http:/www.parkassist.com/press-more3-camera-system.html, Oct. 13, 2020.
Exhibit G to Park Assist, LLC's Opening Claim Construction Brief Pursuant to Patent L.R. 4.4(a) filed Oct. 27, 2020, U.S. Appl. No. 15/406,797 Prosecution History, Appeal Brief, Document 98-10 (36 pages).
Exhibi H to Park Assist, LLC's Opening Claim Construction Brief Pursuant to Patent L.R. 4.4(a) filed Oct. 27, 2020, Excerpts of Dr. Havlicek Oct. 6, 2020 Deposition Transcript, Document 98-11 (16 pages).
Exhibit I to Park Assist, LLC's Opening Claim Construction Brief Pursuant to Patent L.R. 4.4(a) filed Oct. 27, 2020, '956 Patent Prosecution History, May 9, 2016 Amendment and Response to Non-Final Office Action, Document 98-12 (23 pages).
Defendant Ace Parking Management, Inc.'s Notice of Joinder in Defendant San Diego County Regional Airport Authority's Response to Park Assist's Claim Construction Brief and Plaintiff Indect USA Corp.'s Response to Park Assist's Claim Construction Brief Filed in Case No. 3:18-cv-2409-BEN-DEB filed Nov. 10, 2020, Document 100 (3 pages).
Defendant San Diego County Regional Airport Authority's Responsive Claim Construction Brief filed Nov. 10, 2020, Document 101 (16 pages).
Park Assist, LLC's Responsive Claim Construction Brief Pursuant to Patent L.R. 4.4(b) filed Nov. 10, 2020, Document 102 (14 pages).
Exhibit J to Melgar Declaration in Support of Park Assist's Responsive Claim Construction Brief Indect Manual (11 pages).
Exhibit K to Melgar Declaration in Support of Park Assist's Responsive Claim Construction Brief (9 pages).
Exhibit L to Melgar Declaration in Support of Park Assist's Responsive Claim Construction Brief (22 pages).
Exhibit M to Melgar Declaration in Support of Park Assist's Responsive Claim Construction Brief (20 pages).
Exhibit N to Melgar Declaration in Support of Park Assist's Responsive Claim Construction Brief (14 pages).
Declaration of Tod Melgar in Support of Park Assist, LLC's Responsive Claim Construction Brief Pursuant to Patent L.R. 4.4(b) dated Nov. 10, 2020 (2 pages).
Declaration of Scott Dubois in Support of Park Assist, LLC's Opening Claim Construction Brief, filed Oct. 27, 2020, Document 73-1 (13 pages).
Declaration of Tod Melgar in Support of Park Assist, LLC's Opening Claim Construction Brief Pursuant to Patent L.R. 4.4(a), filed Oct. 27, 2020, Document 73-2 (3 pages).
Table of Exhibits in Support of Park Assist's Opening Claim Construction Brief, filed Oct. 27, 2020, Document 73-3 (1 page).
Exhibit A to Melgar Declaration in Support of Park Assist's Opening Claim Construction Brief, filed Oct. 27, 2020, Document 73-4 (30 pages).
Exhibit B to Melgar Declaration in Support of Park Assist's Opening Claim Construction Brief, filed Oct. 27, 2020, Document 73-5 (23 pages).
Exhibit C to Melgar Declaration in Support of Park Assist's Opening Claim Construction Brief, filed Oct. 27, 2020, Document 73-6 (40 pages).
Exhibit D to Melgar Declaration in Support of Park Assist's Opening Claim Construction Brief, filed Oct. 27, 2020, Document 73-7 (44 pages).
Exhibit E to Melgar Declaration in Support of Park Assist's Opening Claim Construction Brief, filed Oct. 27, 2020, Document 73-8 (17 pages).
Exhibit F to Melgar Declaration in Support of Park Assist's Opening Claim Construction Brief, filed Oct. 27, 2020, Document 73-9 (20 pages).
Exhibit G to Melgar Declaration in Support of Park Assist's Opening Claim Construction Brief, filed Oct. 27, 2020, Document 73-10 (36 pages).
Exhibit H to Melgar Declaration in Support of Park Assist's Opening Claim Construction Brief, filed Oct. 27, 2020, Document 73-11 (16 pages).
Exhibit I to Melgar Declaration in Support of Park Assist's Opening Claim Construction Brief, filed Oct. 27, 2020, Document 73-12 (23 pages).
Declaration of Eric M. Acker in Support of San Diego County Regional Airport Authority's Responsive Claim Construction Brief, filed Nov. 10, 2020, Document 101-1 (3 pages).
Acker Exhibits—Table of Contents, filed Nov. 10, 2020, Document 101-2 (1 page).
Exhibit F—Deposition transcript of Scott Dubois, taken on Oct. 8, 2020, filed Nov. 10, 2020, Document 101-3 (48 pages).
Exhibit G—Deposition transcript of Joseph Havlicek, taken on Oct. 6, 2020, filed Nov. 10, 2020, Document 101-4 (19 pages).
Declaration of Tod Melgar in Support of Park Assist, LLC's Responsive Claim Construction Brief Pursuant to Patent L.R. 4.4(b) filed Nov. 10, 2020, Document 76-1 (2 pages).
Exhibit J to Melgar Declaration in Support of Park Assist's Responsive Claim Construction Brief, Document 76-2, filed Nov. 10, 2020, Document 76-2 (11 pages).
Exhibit J to Melgar Declaration in Support of Park Assist's Responsive Claim Construction Brief, Document 102-2, filed Nov. 10, 2020.
Exhibit K to Melgar Declaration in Support of Park Assist's Responsive Claim Construction Brief, Document 76-3, filed Nov. 10, 2020, Document 102-2 (11 pages).
Exhibit K to Melgar Declaration in Support of Park Assist's Responsive Claim Construction Brief, Document 102-3, filed Nov. 10, 2020 (9 pages).
Exhibit L to Melgar Declaration in Support of Park Assist's Responsive Claim Construction Brief, Document 76-4, filed Nov. 10, 2020 (9 pages).
Exhibit L to Melgar Declaration in Support of Park Assist's Responsive Claim Construction Brief, Document 102-4, filed Nov. 10, 2020 (22 pages).
Exhibit M to Melgar Declaration in Support of Park Assist's Responsive Claim Construction Brief, Document 76-5, filed Nov. 10, 2020 (22 pages).
Exhibit M to Melgar Declaration in Support of Park Assist's Responsive Claim Construction Brief, filed Nov. 10, 2020, Document 102-5 (20 pages).
Exhibit N to Melgar Declaration in Support of Park Assist's Responsive Claim Construction Brief, Document 76-6, filed Nov. 10, 2020 (14 pages).
Exhibit N to Melgar Declaration in Support of Park Assist's Responsive Claim Construction Brief, filed Nov. 10, 2020, Document 102-6 (14 pages).
Table of Exhibits in Support of Park Assist's Responsive Claim Construction Brief 3:18-CV-2068-BEN-DEB 3:18-CV-2409-BEN-DEB, Document 102-7 (1 page).
Table of Exhibits in Support of Park Assist's Responsive Claim Construction Brief 3:18-CV-2068-BEN-DEB 3:18-CV-2409-BEN-DEB, Document 76-7 (1 page).
Declaration of Tod Melgar in Support of Park Assist, LLC's Responsive Claim Construction Brief Pursuant to Patent L.R. 4.4(b), filed Nov. 10, 2020, Document 102-1 (2 pages).
Table of Exhibits in Support of Park Assist's Responsive Claim Construction Brief 3:18-CV-2068-BEN-DEB 3:18-CV-2409-BEN-DEB (1 page).

(56) References Cited

OTHER PUBLICATIONS

Park Assist, LLC's Responsive Claim Construction Brief Pursuant to Patent L.R. 4.4(b) dated Nov. 10, 2020 (14 pages).
Claims Construction Order dated Dec. 3, 2020, Document 104 (18 pages).
Indect USA Corp.'s Opening Claim Construction Brief filed Oct. 27, 2020, Document 72 (31 pages).
Declaration of Paul V. Storm in Support of Plaintiff Indect USA Corp.'s Opening Claim Construction Brief filed Oct. 27, 2020, Document 72-1 (4 pages).
Exhibit A to Declaration of Paul V. Storm in Support of Plaintiff Indect USA Corp.'s Opening Claim Construction Brief filed Oct. 27, 2020, Document 72-2 (18 pages).
Exhibit B to Declaration of Paul V. Storm in Support of Plaintiff Indect USA Corp.'s Opening Claim Construction Brief filed Oct. 27, 2020, Document 72-3 (30 pages).
Exhibit C to Declaration of Paul V. Storm in Support of Plaintiff Indect USA Corp.'s Opening Claim Construction Brief filed Oct. 27, 2020., Document 72-4 (21 pages).
Exhibit D to Declaration of Paul V. Storm in Support of Plaintiff Indect USA Corp.'s Opening Claim Construction Brief filed Oct. 27, 2020, Document 72-5 (14 pages).
Exhibit E to Declaration of Paul V. Storm in Support of Plaintiff Indect USA Corp.'s Opening Claim Construction Brief filed Oct. 27, 2020, Document 72-6 (13 pages).
Exhibit F Declaration of Paul V. Storm in Support of Plaintiff Indect USA Corp.'s Opening Claim Construction Brief filed Oct. 27, 2020, Document 72-7 (5 pages).
Exhibit G Declaration of Paul V. Storm in Support of Plaintiff Indect USA Corp.'s Opening Claim Construction Brief filed Oct. 27, 2020, Document 72-8 (23 pages).
Exhibit H Declaration of Paul V. Storm in Support of Plaintiff Indect USA Corp.'s Opening Claim Construction Brief filed Oct. 27, 2020, Document 72-9 (17 pages).
Exhibit I Declaration of Paul V. Storm in Support of Plaintiff Indect USA Corp.'s Opening Claim Construction Brief filed Oct. 27, 2020, Document 72-10 (6 pages).
Park Assist, LLC's Opening Claim Construction Brief Pursuant to Patent L.R. 4.4(a) filed Oct. 27, 2020, Document 72-11 (31 pages).
Indect USA Corp.'s, Response to Park Assist's Claim Construction Brief Pursuant to Patent L.R. 4.4(b) filed Nov. 10, 2020, Document 75 (14 pages).
Declaration of Paul V. Storm in Support of Plaintiff Indect USA Corp.'s Opening Claim Construction Brief filed Nov. 10, 2020, Document 75-1 (3 pages).
Exhibit J to Scott Dubois Deposition filed Nov. 10, 2020, Document 75-2 (13 pages).
Park Assist, LLC's Responsive Claim Construction Brief Pursuant to Patent L.R. 4.4(b) filed Nov. 10, 2020, Document 76 (14 pages).
Defendant Ace Parking Management, Inc.'s Notice of Joinder in Defendant San Diego County Regional Airport Authority's Opening Claim Construction Brief and Plaintiff Indect USA Corp.'s Opening Claim Construction Brief Filed in Case No. 3:18-cv-2409-BEN-DEB filed Oct. 27, 2020, Document 96 (3 pages).
Defendant San Diego County Regional Airport Authority's Opening Claim Construction Brief filed Oct. 27, 2020, Document 97 (32 pages).
Declaration of Joseph Havlicek, Ph.D., In Support of Defendant San Diego County Airport Authority's Opening Claim Construction Brief filed Oct. 27, 2020, Document 97-1 (51 pages).
Havlicek Exhibits—Table of Contents filed Oct. 27, 2020, Document 97-2 (2 pages).
Exhibit 1 Declaration of Joseph Havlicek, Ph.D., In Support of Defendant San Diego County Airport Authority's Opening Claim Construction Brief—Curriculum Vitae, filed Oct. 27, 2020, Document 97-3 (28 pages).
Exhibit 2 Declaration of Joseph Havlicek, Ph.D., In Support of Defendant San Diego County Airport Authority's Opening Claim Construction Brief—U.S. Pat. No. 9,594,956, filed Oct. 27, 2020, Document 97-4 (30 pages).
Exhibit 3 Declaration of Joseph Havlicek, Ph.D., In Support of Defendant San Diego County Airport Authority's Opening Claim Construction Brief—Amendment and Response to Second Non-Final Office Action, dated Dec. 5, 2017 from the U.S. Appl. No. 15/406,797, filed Oct. 27, 2020, Document 97-5 (5 pages).
Exhibit 4 Declaration of Joseph Havlicek, Ph.D., In Support of Defendant San Diego County Airport Authority's Opening Claim Construction Brief—Interview Summary and After Final Response and Amendment, dated Dec. 2, 2015, and filed Dec. 3, 2015 from the U.S. Appl. No. 13/697,380, filed Oct. 27, 2020, Document 97-6 (4 pages).
Exhibit 5 Declaration of Joseph Havlicek, Ph.D., In Support of Defendant San Diego County Airport Authority's Opening Claim Construction Brief—Office Action, dated Feb. 9, 2016 from the U.S. Appl. No. 13/697,380, filed Oct. 27, 2020, Document 97-7 (6 pages).
Exhibit 6 Declaration of Joseph Havlicek, Ph.D., In Support of Defendant San Diego County Airport Authority's Opening Claim Construction Brief—Office Action, dated Dec. 28, 2017 from the U.S. Appl. No. 15/406,797, filed Oct. 27, 2020, Document 97-8 (8 pages).
Exhibit 7 Declaration of Joseph Havlicek, Ph.D., In Support of Defendant San Diego County Airport Authority's Opening Claim Construction Brief—Office Action, dated May 4, 2018 from the U.S. Appl. No. 15/406,797, filed Oct. 27, 2020, Document 97-9 (4 pages).
Exhibit 8 Declaration of Joseph Havlicek, Ph.D., In Support of Defendant San Diego County Airport Authority's Opening Claim Construction Brief—Amendment and Response to First Non-Final Office Action, dated Dec. 24, 2014 from the U.S. Appl. No. 13/697,380, filed Oct. 27, 2020, Document 97-10 (5 pages).
Exhibit 9 Declaration of Joseph Havlicek, Ph.D., In Support of Defendant San Diego County Airport Authority's Opening Claim Construction Brief—Amendment and Response to Final Office Action, dated Feb. 26, 2015 from the U.S. Appl. No. 13/697,380, filed Oct. 27, 2020, Document 97-11 (5 pages).
Exhibit 10 Declaration of Joseph Havlicek, Ph.D., In Support of Defendant San Diego County Airport Authority's Opening Claim Construction Brief—Proposed Amendment for Applicant Initiated Interview, dated Nov. 12, 2015 from the U.S. Appl. No. 13/697,380, filed Oct. 27, 2020, Document 97-12 (5 pages).
Exhibit 11 Declaration of Joseph Havlicek, Ph.D., In Support of Defendant San Diego County Airport Authority's Opening Claim Construction Brief—Amendment and Response to Final Office Action, dated Mar. 26, 2018 from the U.S. Appl. No. 15/406,797, filed Oct. 27, 2020, Document 97-13 (4 pages).
Exhibit 12 Declaration of Joseph Havlicek, Ph.D., In Support of Defendant San Diego County Airport Authority's Opening Claim Construction Brief—Informal Comments under Article 19(1), dated Mar. 7, 2012 from the International Application No. PCT/1B2011/052024, filed Oct. 27, 2020, Document 97-14 (3 pages).
Declaration of Eric M. Acker in Support of San Diego County Regional Airport Authority's Opening Claim Construction Brief filed Oct. 27, 2020, Document 97-15 (4 pages).
Acker Exhibits Table of Contents filed Oct. 27, 2020, Document 97-16 (1 page).
Exhibit A to Declaration of Eric M. Acker in Support of San Diego County Regional Airport Authority's Opening Claim Construction Brief filed Oct. 27, 2020, Deposition transcript of Scott Dubois, filed Oct. 27, 2020, Document 97-17 (67 pages).
Exhibit B to Declaration of Eric M. Acker in Support of San Diego County Regional Airport Authority's Opening Claim Construction Brief filed Oct. 27, 2020, Webster's New College Dictionary (3rd ed. 2008), defining "collocate", Document 97-18 (5 pages).
Exhibit C to Declaration of Eric M. Acker in Support of San Diego County Regional Airport Authority's Opening Claim Construction Brief filed Oct. 27, 2020, Amendment and Response to Non-Final Office Action, dated May 9, 2016 f om the U.S. Appl. No. 13/697,380, Document 97-19 (5 pages).
Exhibit D to Declaration of Eric M. Acker in Support of San Diego County Regional Airport Authority's Opening Claim Construction Brief filed Oct. 27, 2020, Amendment and Response to First

(56) References Cited

OTHER PUBLICATIONS

Non-Final Office Action, dated Apr. 27, 2017 from the U.S. Appl. No. 15/406,797, Document 97-20 (4 pages).
Exhibit E to Declaration of Eric M. Acker in Support of San Diego County Regional Airport Authority's Opening Claim Construction Brief filed Oct. 27, 2020, Webster's New College Dictionary (3 d ed. 2008), defining "toggle" and "visual", Document 97-21 (6 pages).
Park Assist, LLC's Opening Claim Construction Brief Pursuant to Patent L.R. 4.4(a) filed Oct. 27, 2020, Document 98 (31 pages).
Declaration of Scott Dubois in Support of Park Assist, LLC's Opening Claim Construction Brief filed Oct. 27, 2020, Document 98-1 (13 pages).
Declaration of Tod Melgar in Support of Park Assist, LLC's Opening Claim Construction Brief Pursuant to Patent L.R. 4.4(a) filed Oct. 27, 2020 Document 98-2 (3 pages).
Table of Exhibits in Support of Park Assist's Opening Claim Construction Brief filed Oct. 27, 2020 Document 98-3 (1 page).
Exhibit A to Park Assist, LLC's Opening Claim Construction Brief Pursuant to Patent L.R. 4.4(a) filed Oct. 27, 2020, U.S. Pat. No. 9,594,956, Document 98-4 (30 pages).
Exhibit B to Park Assist, LLC's Opening Claim Construction Brief Pursuant to Patent L.R. 4.4(a) filed Oct. 27, 2020, U.S. Appl. No. 15/406,797 Prosecution History, Dec. 28, 2017 Office Action, Document 98-5 (23 pages).
Exhibit C to Park Assist, LLC's Opening Claim Construction Brief Pursuant to Patent L.R. 4.4(a) filed Oct. 27, 2020, U.S. Appl. No. 61/332,822, Document 98-6 (40 pages).
Exhibit D to Park Assist, LLC's Opening Claim Construction Brief Pursuant to Patent L.R. 4.4(a) filed Oct. 27, 2020, '956 Patent Prosecution History, Feb. 26, 2015 Amendment and Response, Document 98-7 (44 pages).
Exhibit E to Park Assist, LLC's Opening Claim Construction Brief Pursuant to Patent L.R. 4.4(a) filed Oct. 27, 2020, '956 Patent Prosecution History, Dec. 2, 2015 Interview Summary and After Final Response and Amendment, Document 98-8 (17 pages).
Exhibit F to Park Assist, LLC's Opening Claim Construction Brief Pursuant to Patent L.R. 4.4(a) filed Oct. 27, 2020, '956 Patent Prosecution History, Aug. 3, 2015 Amendment and Response to Second Non-Final Office Action, Document 98-9 (20 pages).
Defendants San Diego County Regional Airport Authority And Ace Parking Management Patent L.R 3.3 Invalidity Contentions And Patent L.R. 3.4 Document Production dated Aug. 4, 2020 (pp. 1-23).
Exhibit A to Defendants San Diego County Regional Airport Authority And Ace Parking Management Patent L.R 3.3 Invalidity Contentions And Patent L.R. 3.4 Document Production dated Aug. 4, 2020 (pp. 1-85).
Exhibit B to Defendants San Diego County Regional Airport Authority And Ace Parking Management Patent L.R 3.3 Invalidity Contentions And Patent L.R. 3.4 Document Production dated Aug. 4, 2020 (pp. 1-98).
Exhibit C to Defendants San Diego County Regional Airport Authority And Ace Parking Management Patent L.R 3.3 Invalidity Contentions And Patent L.R. 3.4 Document Production dated Aug. 4, 2020 (pp. 1-113).
Exhibit D to Defendants San Diego County Regional Airport Authority And Ace Parking Management Patent L.R 3.3 Invalidity Contentions And Patent L.R. 3.4 Document Production dated Aug. 4, 2020 (pp. 1-110).
Exhibit E to Defendants San Diego County Regional Airport Authority And Ace Parking Management Patent L.R 3.3 Invalidity Contentions And Patent L.R. 3.4 Document Production dated Aug. 4, 2020 (pp. 1-77).
Exhibit F to Defendants San Diego County Regional Airport Authority And Ace Parking Management Patent L.R 3.3 Invalidity Contentions And Patent L.R. 3.4 Document Production dated Aug. 4, 2020 (pp. 1-111).
Mouskos, et al. "Technical Solutions to Overcrowded Park and Ride Facilities" (2007), pp. 1-219.
Chang, "Intelligent Parking Lot System: License Plate Recognition, Vehicle Guidance, and Device Control Subsystems" 2009.

Idris, et al., "Car Park System: A Review of Smart Parking System and its Technology", Information Technology Journal 8(2) 101-113 (2009), pp. 101-113.
"Technical Specification Parking Revenue Control System (PRCS)", Metropolitan Washington Airports Authority (2009) pp. 1-193.
Indect System System Specifications, Indenct Electronics & Districution GmbH (2009) pp. 3-32.
Sipark—The world's largest Parking Guidance System is in the making at Munich Airport ("Siemens 2006 Press Release") https://www.parking-net.com/parking-news/-sipark-the-world-s-largest-parking-guidance-system-is-in-the-making-at-munich-airport (2006).
Funck, et al., "Determining Car-Park Occupancy from Single Images", IEEE Intelligent Vehicles Symposium (2004) pp. 325-328.
Automated Vehicle Occupancy Monitoring Systems for HOV / HOT Facilities Final Report, McCormick Rankin Corporation (2004).
Susan Shaheen, "Smart Parking Management Field Test: A Bay Area Rapid Transit (BART) District Parking Demonstration", httos://escholarshio.org/uc/item/6d58554x (2005).
Hamey, et al. "Automatic Number Plate Recognition for Australian Conditions" Digital Image Computing: Techniques and Applications (2005).
Brian P.Guy, "Evaluation of Data Collection Techniques & Methods For Roadside Station Origin-Destination Studies", A Thesis submitted to the faculty of Purdue University (2005) pp. 1-128.
Idris, et al., "An Intelligent Parking Information System", In Proceedings of 3rd International Conference on Artificial Intelligence in Engineering and Technology (2006).
Teng, et al., "Parking Difficulty and Parking Information System Technologies and Costs", Journal of Advanced Transportation, vol. 42, No. 2, pp. 151-178 (2006) pp. 151-178.
Li Fei-Fei, "One-Shot Learning of Object Categories", IEEE Transactions on Patterns Analysis and Machine Intellegence, vol. 28, No. 4 (2006) pp. 594-611.
Lin, et al., "A Vision-Based Parking Lot Management System", IEEE International Conference on Systems, Man, and Cybernetics (2006) pp. 2897-2902.
Chinrungrueng, et al., "Smart Parking: an Application of optical Wireless Sensor Network", International Symposium on Applications and the Internet Workshops (2007).
Sastre, et al., "Computer Algebra Algorithms Applied to Computer Vision in a Parking Management System", Department of Signal Theory and Communications IEEE (2007) pp. 1675-1680.
Wu, et al., "Robust Parking Space Detection Considering Inter-Space Correlation", IEEE (2007) pp. 659-662.
Arth, et al., "Real-Time License Plate Recognition on an Embedded DSP-Platform", IEEE (2007).
About This Encyclopedia, Victoria Transport Policy Institute / TDM Encyclopedia https://web.archive.org/web/20090321090946/http://www.vtpi.org/tdm/ . . . (2007).
Tomas Fabian, "An Algorithm for Parking Lot Occupation Detection", IEEE 2008, pp. 165-170.
Huang et al., "A Bayesian Hierarchical Detection Framework For Parking Space Detection", IEEE (2008), pp. 2097-2100.
Prabuwono, et al., "A Study of Car Park Control System Using Optical Character Recognition", IEEE (2008) pp. 866-870.
Yoo, et al., "PGS: Parking Guidance System based on Wireless Sensor Network", IEEE (2008), pp. 218-222.
For, et al., "A Multi-Camera Collaboration Framework for Real-Time Vehicle Detection and License Plate Recognition on Highways", IEEE (2008), pp. 192-197.
AutoVu: Networked License Plate Recognition Solution Genetec Inc. / Webarchive http://www.genetec.com/English/Products/Pages/license-plate-recognition.aspx (2008).
Parking Management, Victoria Transport Policy Institute / TDM Encyclopedia (2008).
Bong, et al., "Integrated Approach in the Design of Car Park Occupancy Information System (COINS)", IAENG International Journal of Computer Science, 35:1 (2008).
Parking Evaluation, Victoria Transport Policy Institute / TDM Encyclopedia (2008).
License Plate Recognition—A Tutorial, Hi-Tech Solutions / Webarchive, web.archive.org/web/20090216182946/http://www.licenseplaterecognition.com (2008), pp. 1-10.

(56) References Cited

OTHER PUBLICATIONS

Yan, et al., "SmartParking: A Secure and Intelligent Parking System Using Notice", IEEE (2008).

Anagnostopoulos, et al. "License Plate Recognition From Still Images and Video Sequences: A Survey", IEEE (2008), pp. 377-391.

Ichihashi, et al., "Vacant Parking Space Detector for Outdoor Parking Lot by Using Surveillance Camera and FCM Classifier", IEEE (2009), pp. 127-134.

Idris et al., "Smart Parking System using Image Processing Techniques in Wireless Sensor Network Environment", Information Technology Journal 8(2): 114-127 (2009), pp. 114-127.

Lu, et al., "SPARK: A New VANET-based Smart Parking Scheme for Large Parking Lots", IEEE INFOCOM (2009), pp. 1413-1421.

Marchesotti, et al., "A framework for visual saliency detection with applications to image thumbnailing", IEEE (2009), pp. 2232-2239.

Srikanth, et al., "Design and Implementation of a prototype Smart PARKing (SPARK) System using Wireless Sensor Networks", IEEE (2009), pp. 401-406.

Wang, et al., "Joint learning of visual attributes, object classes and visual saliency", IEEE (2009), pp. 537-544.

Koralalage et al., "Intelligent and Standardized Parking Solution", International Journal of Computer Science and Network Security, vol. 9 No. 4 (2009), pp. 213-223.

Alina Haines, "The role of automatic number plate recognition surveillance within policing and public reassurance", University of Huddersfield (2009), pp. 1-334.

Molder, et al., "Decision Fusion for Improved Automatic License Plate Recognition", WSEAS Transactions on Information Science and Applications (2009), pp. 291-300.

Alexe, et al., "What is an object?", IEEE (2010), pp. 73-80.

Catani, et al., "A framework based on vision sensors for the automatic management of exchange parking areas", IEEE (2010), pp. 319-324.

Office Action issued in corresponding application CA 2798925 dated Sep. 7, 2021 (4 pages).

\* cited by examiner

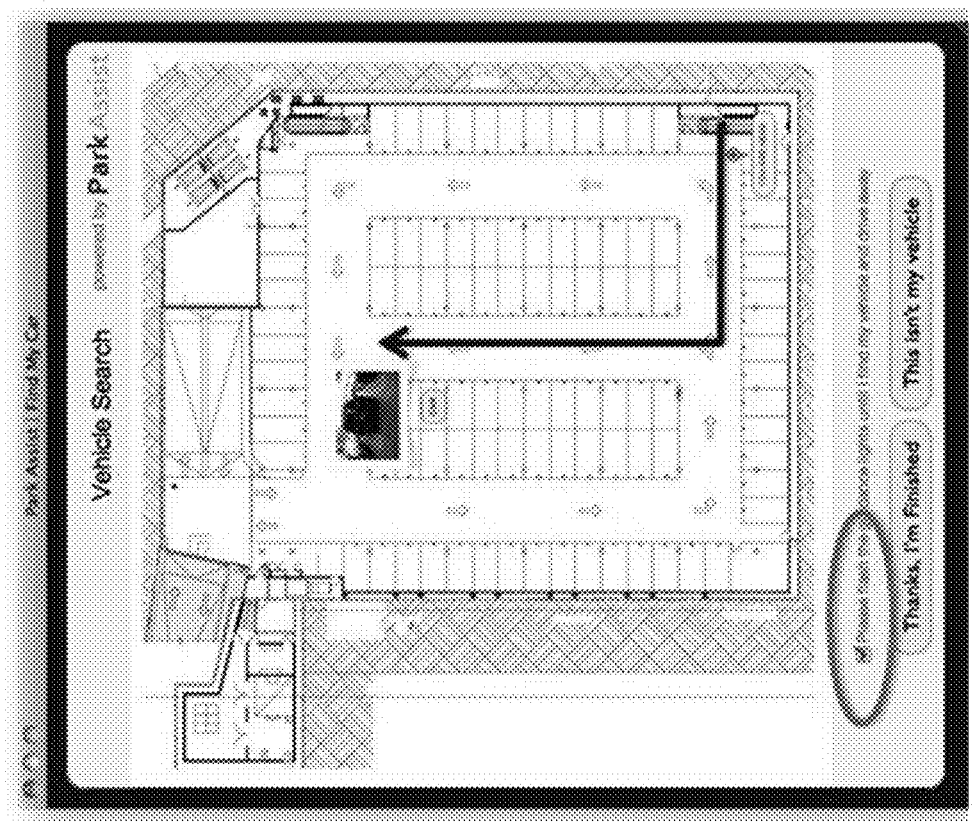
FIGURE 5

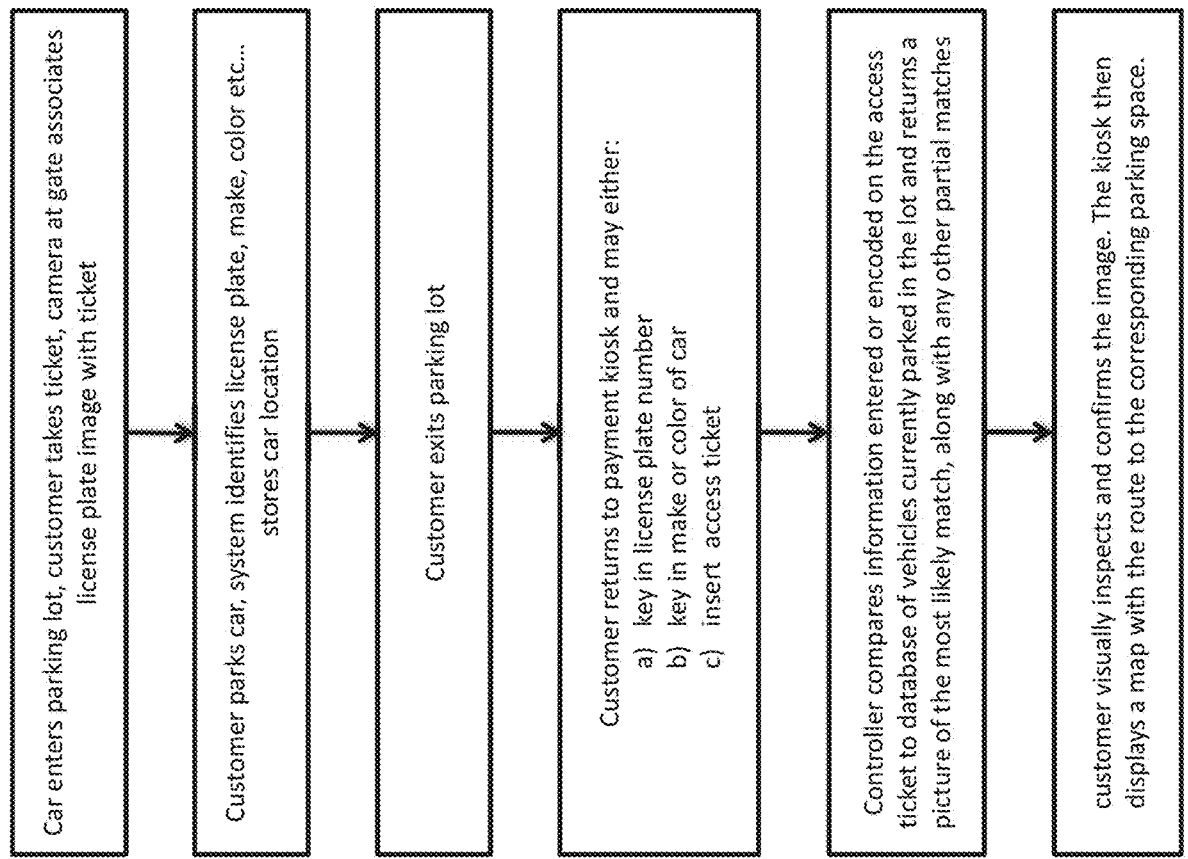

METHOD AND SYSTEM FOR MANAGING A PARKING LOT BASED ON INTELLIGENT IMAGING

FIELD AND BACKGROUND OF THE INVENTION

The present invention relates to the management of a parking lot and, more particularly, to setting up and using a parking lot managing system that relies on intelligent processing of images of the various parking spaces.

A number of methods have been proposed in the past in order to provide customers guidance within a parking lot to quickly find available space. The use of different sensor technologies, such as ultrasonics or image processing is known. These methods may determine occupancy of slots and provide the driver with guidance to available spaces either upon entry to the parking lot or by displays strategically located within the lot. See for example Trajkovic et al., U.S. Pat. No. 6,426,708, which patent is incorporated by reference for all purposes as if fully set forth herein. However, these methods do not provide customers with guidance to find their car when leaving the parking lot. They do not allow the parking lot proprietor the opportunity to preferentially charge the customer according their parking location within the parking lot. Furthermore, these systems do not integrate the parking lot illumination system with the parking control system so as to enable illumination levels or ventilation systems to be controlled based on parking occupancy, reducing energy consumption. In addition, they do not detect the type of object that is stored in the space, determining if it is a car, motorcycle, parking cart, or other object. They also do not recognize unique aspects of the vehicle, such as make, model, color, and license plate, and thus do not allow the opportunity to present targeted advertisements or marketing programs based on such information. They also do not enable remote viewing of individual parking spaces, enabling human intervention to correct mistakes, detect faulty hardware, or provide real-time feedback to improve system accuracy. Finally, they are not integrated with closed circuit security systems, nor do they offer any information about vehicle and passenger security, such as thefts and violent attacks.

Definitions

An "occupancy and identity image" is understood herein to mean an image from which either a human operator or a computer equipped with appropriate image processing software can decide whether a parking space is occupied and also can determine the identity of a vehicle that occupies an occupied parking space. A typical example of such an image is an image from which a license plate detection algorithm can extract a license plate number.

An "occupancy image" is understood herein to mean an image from which either a human operator or a computer equipped with appropriate image processing software can decide whether a parking space is occupied.

An "identification image" is understood herein to mean an image from which either a human operator or a computer equipped with appropriate image processing software can determine the identity of a vehicle given that the image is known to be an image of a vehicle.

The images may be acquired in any convenient wavelength band: infrared, visible or ultraviolet. Usually, the images are RGB images at visible wavelengths.

SUMMARY OF THE INVENTION

One objective of the present invention is to provide guidance to customers to efficiently find available parking in a parking lot. A second objective of the present invention is to provide customers guidance in finding their car within a parking lot. A third objective of the present invention is to enable preferential pricing for parking based on location within the parking lot. A fourth objective of the present invention is to reduce parking lot energy consumption. A fifth objective of the present invention is to improve parking lot security. A sixth objective of the present invention is to determine the type of object or vehicle that is currently parked in the parking space, to determine if it is a car, motorcycle, person, parking cart, or other object. A seventh objective of the present invention is to improve enforcement of parking lot rules and regulations. An eighth objective of the present invention is to administer targeted advertising and loyalty programs through vehicle identification. A ninth objective of the present invention is to automatically discover the network topology to enable efficient mapping of the sensor locations onto a map of the parking lot, enabling all services already mentioned to be location-based. A tenth objective of the present invention is to provide a platform for real-time remote monitoring and human control of the parking system.

Therefore, according to the present invention there is provided a method of managing a plurality of parking spaces, including: (a) acquiring at least one occupancy and identity image, such that each parking space is imaged in at least one the occupancy and identity image; and (b) in response to an inquiry by a customer who has parked a vehicle in one of the parking spaces, directing the customer to the vehicle, at least in part in accordance with the at least one occupancy and identity image in which the parking space in which the vehicle is parked is imaged.

Furthermore, according to the present invention there is provided a system for managing a plurality of parking spaces, including: (a) at least one parking space camera for acquiring at least one occupancy and identity image, such that each parking space is imaged in at least one the occupancy and identity image; and (b) a controller that, in response to an inquiry by a customer who has parked a vehicle in one of the parking spaces, directs the customer to the vehicle, at least in part in accordance with the at least one occupancy and identity image in which the parking space in which the vehicle is parked is imaged.

Furthermore, according to the present invention there is provided a method of managing a plurality of parking spaces, including: (a) acquiring at least one occupancy image, such that each parking space is imaged in at least one the occupancy image; and (b) controlling at least one respective environmental aspect of the parking spaces at least in part in accordance with the at least one occupancy image.

Furthermore, according to the present invention there is provided a system for managing a plurality of parking spaces, including: (a) at least one camera for acquiring at least one occupancy image, such that each parking space is imaged in at least one the occupancy image; (b) for each of at least one environmental aspect of the parking spaces, a plurality of devices for controlling the each environmental aspect; and (c) a controller that uses the devices to controls the at least one environmental aspect at least in part in accordance with the at least one occupancy image.

Furthermore, according to the present invention there is provided a method of managing a plurality of parking spaces, including: (a) acquiring a respective occupancy image of each parking space; (b) providing a system that assigns each occupancy image a respective status selected from the group consisting of vacant and occupied; (c) displaying the occupancy images along with the statuses thereof; and (d) in response to the displaying: for each occupancy image: (i) deciding whether the respective status of the each occupancy image is incorrect, and (ii) if the respective status of the each occupancy image is incorrect, correcting the respective status of the each occupancy image.

Furthermore, according to the present invention there is provided a system for managing a plurality of parking spaces, including: (a) at least one camera for acquiring a respective occupancy image of each parking space; (b) a display device for displaying at least a portion of the occupancy images; (c) a memory for storing program code for: (i) assigning each occupancy image a respective status selected from the group consisting of vacant and occupied, and (ii) displaying the occupancy images on the display device along with the respective assigned statuses thereof; (d) a processor for executing the program code; and (e) an input device for correcting the respective assigned statuses as displayed on the display device.

Furthermore, according to the present invention there is provided a computer-readable storage medium having computer-readable code embodied on the computer-readable storage medium, the computer-readable code for managing a plurality of parking spaces, the computer-readable code including: (a) program code for assigning to each of a plurality of respective occupancy images of the parking spaces a respective status selected from the group consisting of vacant and occupied; (b) program code for displaying the occupancy images along with the respective assigned statuses thereof; and (c) program code for receiving corrections of the respective assigned statuses.

Furthermore, according to the present invention there is provided a method of configuring a plurality of sensors to monitor parking spaces of a plurality of aisles, each aisle including a respective plurality of the parking spaces, the method including: (a) for each aisle: (i) providing a respective sub-plurality of the sensors for monitoring the parking spaces of the each aisle, each sensor being for monitoring a respective at least one of the parking spaces of the each aisle, and (ii) operationally connecting the sensors of the respective sub-plurality to each other in an ordered string, such that a first sensor of the string is a root node of the string; (b) operationally connecting the root nodes to a central controller, thereby providing a network of the sensors; (c) by the central controller: discovering a topology of the network; and (d) for each string: (i) mapping only one sensor of the string to the respective at least one parking space that the one sensor is to monitor, and (ii) using the topology to map each other sensor of the respective string to the respective at least one parking space that the each other sensor is to monitor.

Furthermore, according to the present invention there is provided a system for monitoring parking spaces of a plurality of aisles, each aisle including a respective plurality of the parking spaces, the system including: (a) for each aisle, a respective plurality of sensors operationally connected to each other in an ordered string, the sensors being for monitoring a respective at least one of the parking spaces of the each aisle, with a first sensor of the string being a root node of the string; and (h) a controller to which the root nodes are operationally connected so that the controller and the strings form a network, the controller being operative: (i) to discover a topology of the network, (ii) to present a user interface for mapping only one sensor of each string to the respective at least one parking space that the one sensor is to monitor, and (iii) for each string, to use the topology to map each sensor of the each string other than the only one sensor of the each string to the respective at least one parking space that the each sensor is to monitor.

Furthermore, according to the present invention there is provided a computer-readable storage medium having computer-readable code embodied on the computer-readable storage medium, the computer-readable code being for configuring a plurality of sensors to monitor parking spaces of a plurality of aisles, each aisle including a respective plurality of the parking spaces, the sensors of each aisle being operationally connected to each other in an ordered string with a first sensor of the string being a root node of the string, the root nodes being operationally connected to a controller so that the controller and the strings form a network, the computer-readable code including: (a) program code for discovering a topology of the network; (b) program code for presenting a user interface for mapping only one sensor of each string to the respective at least one parking space that the one sensor is to monitor; and (c) program code for, for each string, using the topology to map each sensor of the each string other than the only one sensor of the each string to the respective at least one parking space that the each sensor is to monitor.

The methods of the present invention are methods of managing a plurality of parking spaces.

According to a first basic method, one or more occupancy and identity images of the parking spaces are acquired, with each parking space being imaged in at least one of the occupancy and identity images. In response to an inquiry by a customer who has parked a vehicle in one of the parking spaces, the customer is directed to the vehicle, at least in part in accordance with the occupancy and identity image(s) in which the parking space occupied by the vehicle is/are imaged.

Preferably, the occupancy and identity image(s) is/are acquired periodically.

Preferably, the method also includes obtaining an identifier of the vehicle, either before the vehicle is parked or as a part of the inquiry. Examples of such identifiers include license plate numbers and partial or complete visual characterizations such as make and color. One example of an inquiry that provides a vehicle identifier is a typed inquiry that includes the license plate number of the vehicle. The parking space in which the vehicle is parked then is identified, in response to the inquiry, at least in part by comparing the identifier to the occupancy and identity image(s) in which the parking space occupied by the vehicle is/are imaged.

If the identifier of the vehicle is obtained before the vehicle is parked, then the obtaining of the identifier of the vehicle includes acquiring an identification image of the vehicle. Most preferably, the method then includes issuing to the customer a receipt, such as a printed access ticket or a packet that is transmitted wirelessly to a mobile device of the customer, before the customer parks the vehicle. The receipt includes a representation of the identifier.

Preferred modes of directing the customer to the vehicle include displaying a map that shows a route to where the vehicle is parked or issuing navigation instructions, as a printed list or as interactive instructions transmitted wirelessly to a mobile device borne by the customer.

A system for implementing the first basic method includes at least one parking space camera (e.g. cameras 50 in the preferred embodiments described below) and a controller.

The parking space camera(s) is/are for acquiring the occupancy and identity image(s). The controller, in response to the customer's inquiry, directs the customer to the vehicle at least in part in accordance with the occupancy and identity image(s) in which the parking space occupied by the vehicle is/are imaged. Preferably, the system includes a plurality of such parking space cameras, with each parking space camera acquiring respective one or more occupancy and identity images of one or more respective parking spaces. Usually, each parking space camera is dedicated to one, two or four specific respective parking spaces.

Preferably, the system also includes an information terminal at which the customer enters the query. Most preferably, the information terminal includes a display mechanism for displaying instructions that direct the customer to the vehicle. Examples of such display mechanisms include a display screen for displaying a map with directions to the parking space, a printer for printing such a map or for printing a list of navigation instructions, and a transceiver for transmitting such instructions interactively to a mobile device borne by the customer as the customer walks to the parking space. Most preferably, the information terminal also includes an input mechanism that the customer uses to input an identifier of the vehicle. A typical example of such an input mechanism is a keyboard at which the customer types the license plate number of the vehicle. In response to the inquiry, the controller identifies the parking space, in which the vehicle is parked, at least in part by comparing the identifier to (one or more of) the occupancy and identity image(s).

Alternatively or additionally, the system also includes a gateway terminal for obtaining an identifier of the vehicle before the customer parks the vehicle in the parking space. In response to the inquiry, the controller identifies the parking space, in which the vehicle is parked, at least in part by comparing the identifier to (one or more of) the occupancy and identity image(s). Most preferably, the gateway terminal includes a mechanism for issuing to the customer a receipt such as an access ticket that includes a representation of the identifier. Also most preferably, the gateway terminal includes an identification camera for acquiring an identification image of the vehicle.

In the preferred embodiments below, entry kiosks 20 and 21 serve both as information terminals and gateway terminals.

According to a second basic method, one or more occupancy images of the parking spaces are acquired, preferably periodically, with each parking space being imaged in at least one of the occupancy images. One or more respective environmental aspects of the parking spaces are controlled at least in part in accordance with the occupancy image(s). Typically, the environmental aspect(s) that is/are controlled is/are illumination and/or ventilation. A corresponding system includes one or more cameras for acquiring the occupancy image(s), a plurality of devices per environmental aspect for controlling the environmental aspect, and a controller that uses the devices to control the environmental aspect(s) at least in part according to the occupancy image(s).

A third basic method starts with acquiring respective occupancy images of the parking spaces. An image classification system automatically designates each occupancy image either "vacant" or "occupied". The occupancy images are displayed along with their "vacant/occupied" statuses. In response to the display, a human operator decides whether the classifications are correct and corrects the incorrect classifications. Preferably, the image classification system uses a self-modifying classification algorithm, i.e., an algorithm that can be trained to improve the classification accuracy thereof. In response to the corrections by the human operator, the classification system modifies the classification algorithm to be more accurate.

A corresponding system includes one or more cameras for acquiring the occupancy images, a display device for displaying the occupancy images, a memory for storing program code for classifying the occupancy images as either "vacant" or "occupied" and for displaying the occupancy images along with their respective "vacant/occupied" classifications, a processor for executing the code, and an input device that a human operator uses to correct the classifications as displayed on the display device. Preferably, the algorithm that the program code uses to classify the occupancy images is self-modifying. The scope of the invention also includes a computer-readable storage medium bearing such computer-readable program code.

A fourth basic method of the present invention is a method of configuring a plurality of sensors, such as camera units 16 of FIG. 1 below, to monitor parking spaces of a plurality of aisles, such as aisles 11, 12 and 14 of FIG. 1 below, each of which includes its own respective plurality of parking spaces. Each aisle is provided with two or more sensors. It is intended that each sensor be responsible for monitoring one or more respective parking spaces of the aisle. In each aisle, the sensors are connected operationally to each other in an ordered string. (That the string is ordered means that, with N≥2 sensors in the string, the first sensor is connected only to the second sensor, the; last sensor is connected only to the next-to-last sensor, and, if N>2, sensor i (1<i<N)) is connected only to sensors i−1 and i+1.) The first camera in each string is the root node of the string. All the root nodes are connected operationally to a central controller such as system controller 44 of the preferred embodiments described below, either directly or indirectly via intermediate devices such as row controllers 42 of the preferred embodiments described below, thereby providing a network of the sensors. The central controller discovers the topology of the network. Only one sensor of each string (preferably the root node sensor) is mapped to the respective parking space(s) that that sensor is to monitor. The topology is used to map the other sensors of each string to their respective parking spaces.

A corresponding system includes, for each aisle, a respective plurality of sensors operationally connected to each other in an ordered string with a first sensor of the string being a root node of the string, and a controller to which all the root nodes are operationally connected, so that the controller and the strings form a network. The controller is operative to discover the topology of the network, to present a user interface for mapping only one sensor of each string to its respective parking space(s), and to use the topology to map the rest of the sensors to their respective parking spaces. The scope of the invention also includes a computer-readable storage medium bearing computer-readable program code that the controller executes to accomplish those ends.

The controllers of the systems of the present invention may be local to the parking lot that includes the managed parking spaces or, as illustrated in FIG. 2 below, may be distributed among two or more sites with the various components of the controllers communicating with each other via a network such as the Internet.

BRIEF DESCRIPTION OF THE DRAWINGS

Various embodiments are herein described, by way of example only, with reference to the accompanying drawings, wherein:

FIG. 5 shows screen captures that illustrate the "find your car" feature;

FIGS. 11 and 12 are flowcharts of the "find your car" feature.

DESCRIPTION OF THE PREFERRED EMBODIMENTS

The principles and operation of a parking lot according to the present invention may be better understood with reference to the drawings and the accompanying description.

Figure 1:
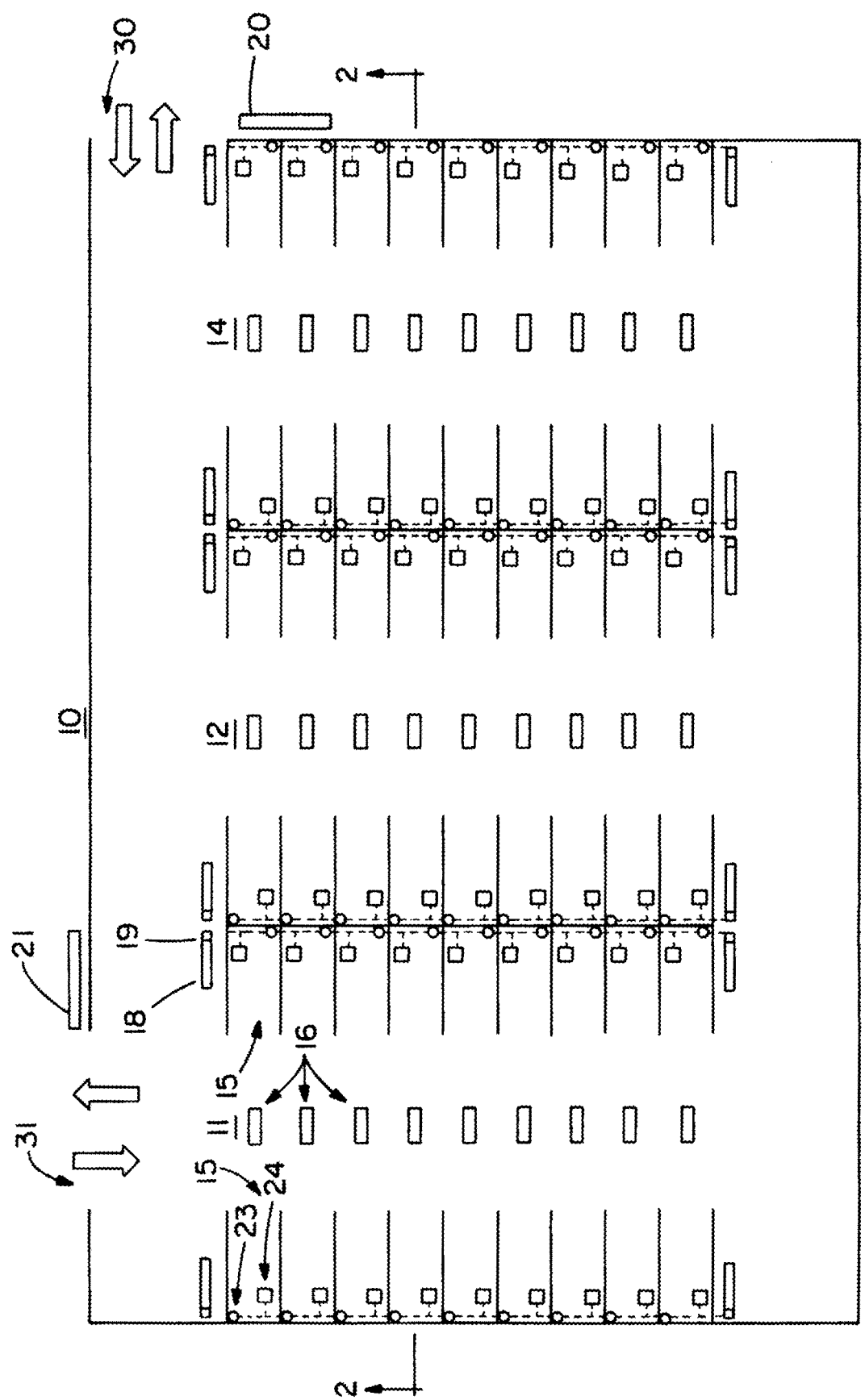
FIG. 1 is a plan view of a parking lot.

Referring now to the drawings, FIG. 1 is a plan view of the interior of an exemplary enclosed parking lot 10 that is managed according to the principles of the present invention. Parking lot 10 includes three aisles 11, 12 and 14, each aisle including two rows of parking spaces 15. Each pair of parking spaces is monitored by an associated camera unit 16. Each parking space 15 is provided with its own ventilation vent 23 and its own lighting fixture 24, in the ceiling of parking lot 10. Each row of parking spaces 15 has two row displays 18 at either end. Each entrance 30, 31 of parking lot 10 has adjacent to it an entry kiosk 20, 21.

Figure 2:
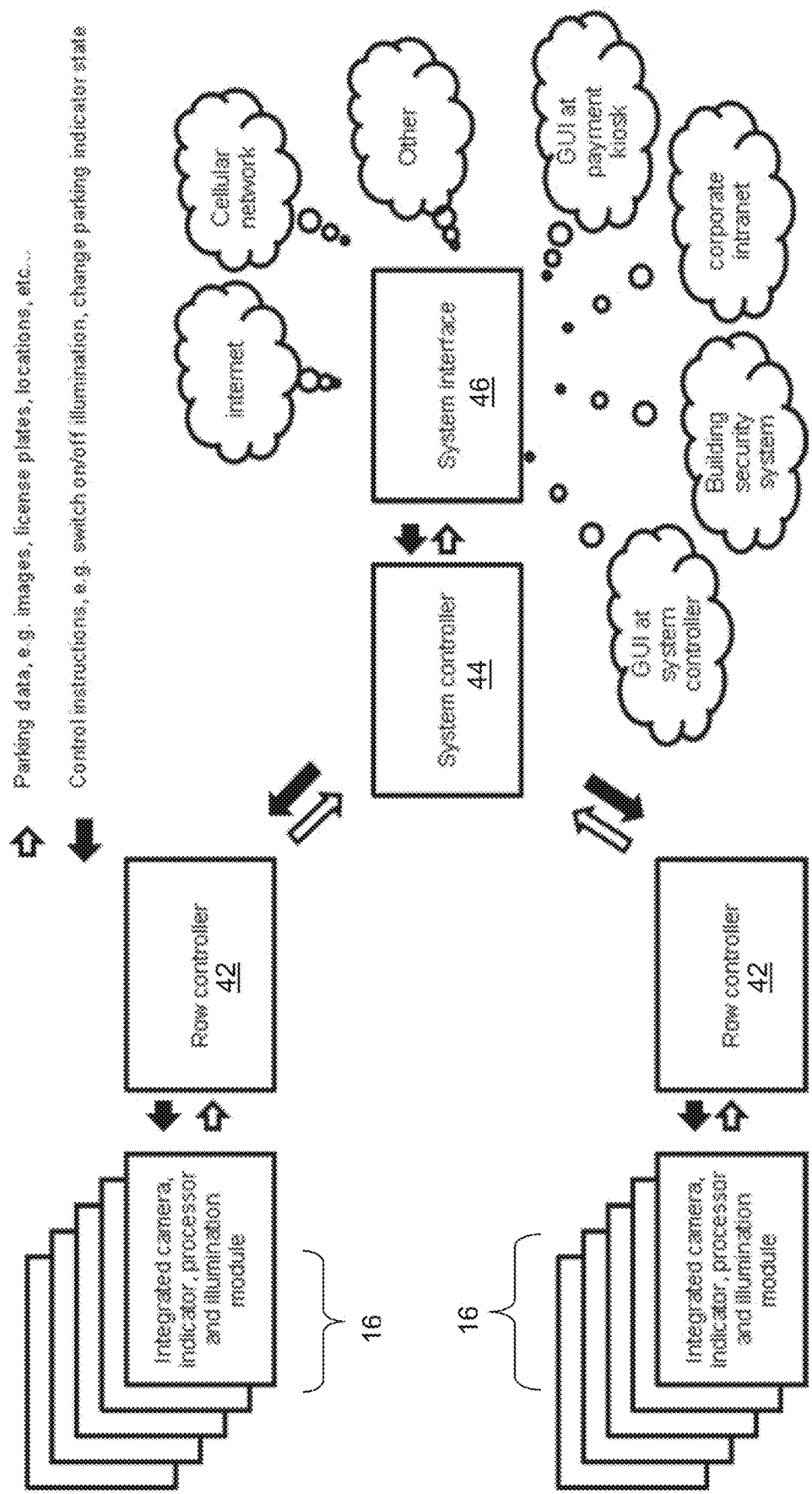
FIG. 2 is a schematic illustration of a system of the present invention.

FIG. 2 illustrates an exemplary embodiment of a system of the current invention. The system includes camera units 16, row controllers 42, a system controller 44 and a system user interface 46. System user interface 46 may be connected to multiple additional external systems as shown in FIG. 2.

In one embodiment of the system of FIG. 2, high resolution, low noise, CMOS digital camera technology is used for the purpose of monitoring every parking space 15. Images that are collected are processed within the individual camera module 16. Images, license plate data or occupancy data or any combination of the three can be passed through row controllers 42 to the central system controller 44 for actual live inspection down to the individual space 15 from the central station.

Remote access to the central station through the Internet can provide control and access including live images from any of up to thousands of cameras throughout a parking garage. Each unit 16 is designed to monitor one or more parking spaces 15 through directly detecting occupancy in the specific parking space 15. In the example of FIG. 1, each unit 16 monitors two parking spaces 15. Furthermore, an energy efficient multicolor LED indicator within unit 16 may be used to indicate the occupancy status of that space 15. For example, a green light may indicate the space 15 is vacant and available for general parking, a blue light may indicate that space 15 is vacant and available for handicapped parking only, and a red light that the space 15 is occupied. In addition to or in place of illumination fixtures 24, energy efficient LED area illumination can also be incorporated into unit 16, with the illumination via units 16 and/or via fixtures 24 controlled by system controller 44 on the basis of local occupancy levels, conserving energy when occupancy levels are low.

Digital scoreboard signs, such as row displays 18, showing the number of vacant spaces 15 in a particular physical area of the parking lot such as the rows of aisles 11, 12 and 14, can be updated by system controller 44 directly, or via row controllers 42.

In one specific embodiment, the system configuration provides centralized access and control down to the individual space 15 level. System controller 44 connects to up to 512 individual row controllers 42 over an extended range Ethernet CAT5e network. Each row controller 42 can be attached to up to 4 rows of 128 individual camera units 16 per row, for a total of 512 cameras per row controller 42. Each camera unit 16 can monitor one or more parking spaces 15, either on opposing sides of the camera unit 16 or in side by side parking bays 15. Thus a single system of the present invention can monitor and control up to one million individual parking spaces 15.

Figure 3:
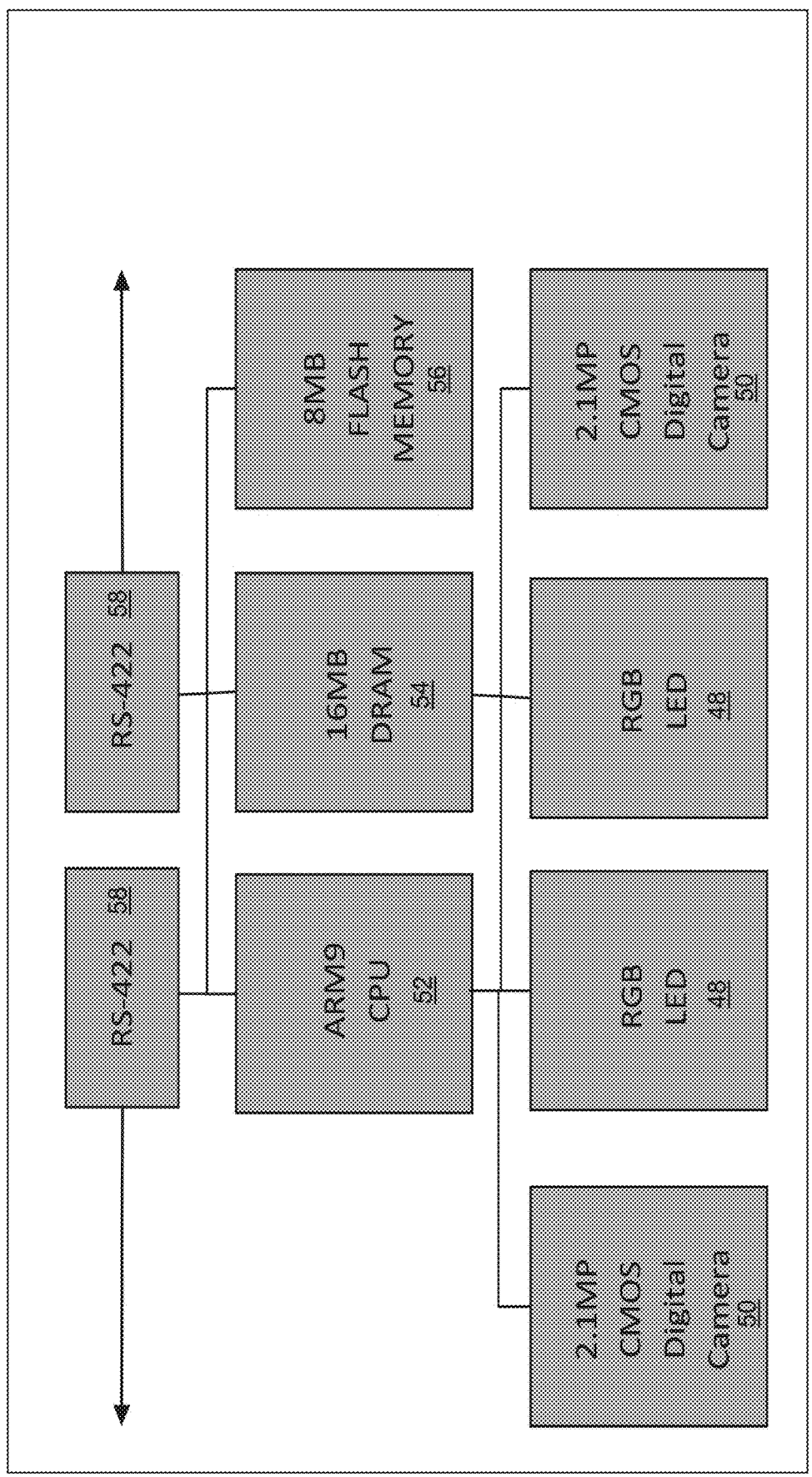
FIG. 3 is a block diagram of a camera unit of FIG. 2.

FIG. 3 is a high level block diagram of a camera unit 16. Camera unit 16 is used to detect, identify and indicate the occupancy of a garage parking space 15.

Each camera unit 16 includes:
- high intensity red, green, and blue LED indicators 48 with diffuser
- two high resolution, high sensitivity CMOS multi-megapixel digital cameras 50
- one or more 400 MHz ARM9 processor 52, available from ARM Ltd. of Cambridge GB, with SDRAM 54 and flash memory 56
- two 10 Mbyte/second RS-422 serial ports 58 for daisy chain installation (or 3-port Ethernet switch)
- optional LPR (License Plate Recognition) software in flash memory 56

Row controller 42 attaches to system controller 44 through extended range CAT5e Ethernet. Each row controller can control up to 4 rows of 128 dual camera modules 16 per row. Because each camera module 16 can monitor multiple spaces, a row controller 42 can monitor more than 1024 parking spaces (in two opposing rows).

Each row controller 42 can be used to control multiple independent signs 18 through two independent RS-422 interfaces.

Figure 4:
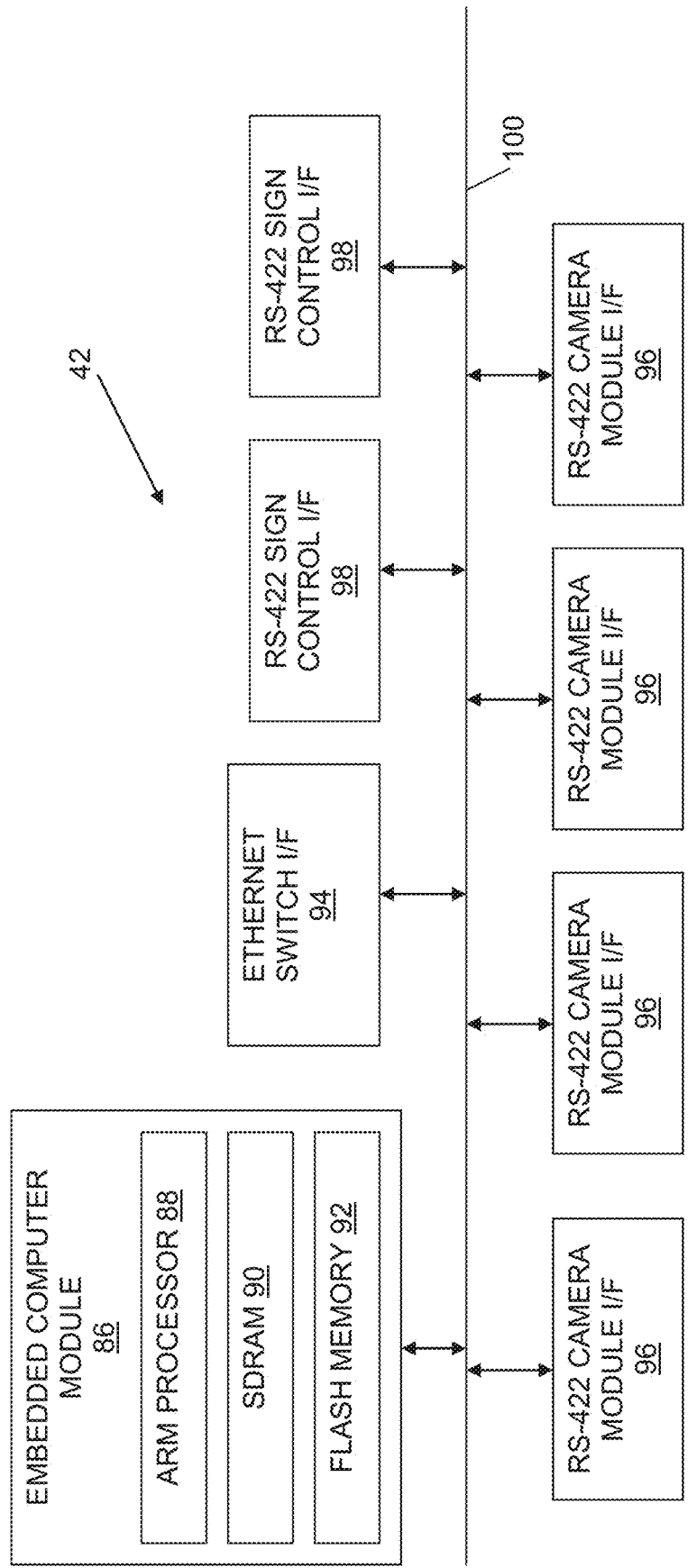
FIG. 4 is a block diagram of a row controller of FIG. 2.

FIG. 4 is a high-level block diagram of a row controller 42. Each row controller 42 includes:
- embedded computer module 86 with ARM processor 88, SDRAM 90 and flash memory 92
- ethernet switch interface 94
- up to 4 RS-422 camera module interfaces 96
- up to 2 sign control interfaces 98

These components communicate with each other via a bus 100.

System controller 44 is a desktop or server grade computer that monitors the entire system and provides a user interface 46 to other external systems that can connect to the parking system. The system is designed in a way that the parking lot signs 18, row controllers 42, and camera units 16 can run even if the system controller 46 is unavailable.

In another exemplary embodiment, camera modules 16 communicate via Ethernet through an on-board three-port Ethernet switch such as the Micrel KSZ8873MLL available from Micrel, San Jose Calif., USA. System controller 44 can then be connected directly to camera units 16, without the intervening row controllers 42. Standard network components such as routers and switches can be used to extend the network in a star topology across any physical layout. In that case, the number of camera units 16 per row is effectively unlimited.

In another exemplary embodiment, peripherals such as digital scoreboard sips 18 are connected to the same Ethernet network, either directly or via Serial-to-Ethernet conversion, and are updated through the network by system controller 44 or by row controllers 42.

In another exemplary embodiment, camera units 16, which may be serial or Ethernet based, are mounted in the center of the driving lane and have two cameras 50, one per side, to monitor bays on opposite sides of the lane. If either of the two spaces 15 is vacant, then LED indicator 48 is turned green to show a vacant regular space and blue to show a vacant handicapped space. If both spaces 15 are occupied, LED indicator 48 is turned red.

In another exemplary embodiment, each camera 50 is aimed such that two adjacent parking spaces 15 are visible in its field of view, so that the camera unit 16 captures information about up to four spaces 15. In that case, if at least one of four (or one of three, or one of two) spaces 15 is vacant, LED indicator 48 is turned green to show a vacant regular space and blue to show a vacant handicapped space. If all spaces 15 are occupied, LED indicator 48 is turned red. This architecture can be further embellished to include N spaces per camera 48 (and thus 2*N spaces per unit 16), provided all N spaces are visible in the field of view of camera 48. Wide-angle lenses can be used to increase the field of view of camera 48.

One preferred aspect of the system is the ability to automatically determine the network topology and map camera units 16 physically onto a map of the parking structure. This can be achieved in a variety of ways, depending on the specific embodiment of the invention;

1. Serial Communication-Packet Decoding Method

For serial communicating camera units 16, each packet gets retransmitted by a camera unit 16 if destination address is somewhere down the row. Each packet includes a header with several fields necessary for discovery of the location of a camera unit 16:
"original address"
"source address"
"destination address"
When packet is received, camera unit 16 checks if a location was assigned. If not, the following applies:
Camera unit 16 checks for a source address. The source address is the address of row controller 42 or the first neighbor on the way to the row controller 42. IF ID is 0, then camera unit 16 is the first on the row.
Camera unit 16 increments the source address of the packet and assigns its own ID.
Camera unit 16 also marks the port where packet was received as HOME port and the other as AWAY port. HOME port is the port towards the row controller 42.
After location is assigned, camera unit 16 uses this ID to mark all outgoing packets in the "source address" field.

2. Ethernet Sorting Version 1—Server Initiated Topology Discovery and Sorting Algorithm This method assumes that the network of camera units 16 is organized into several IP subnets, each with one or more daisy-chain strings of nodes (star topology).

1. System controller 44 sends "Get Version" request to each IP in the IP network group to find out number of camera units 16 and their IP/MAC addresses.
2. System controller 44 assembles a list of all active camera units 16 in the network group.
3. System controller 44 issues request to each camera unit 16 to ping the assembled list of camera units 16 in order to populate MAC table of its Ethernet switch.
4. System controller 44 requests MAC tables from all camera units 16.
5. System controller 44 performs topology discovery and sorting algorithm as follows:

Topology Discovery Algorithm:
System controller 44 finds end camera units 16. End camera units 16 do not have any other camera unit 16 MAC addresses on one of the ports of their Ethernet switch.
System controller 44 chooses randomly a single end camera unit 16.
System controller 44 builds a route by selecting another end camera unit 16 and checking all camera units' 16 MAC tables. A camera unit 16 belongs to this route if both end camera unit 16 MACs are located on separate ports of the camera unit's 16 MAC table. Each camera unit 16 is checked and route is built as a list.
System controller 44 finds the first end camera unit 16 by checking the table for either the System controller's 44 MAC or the router's MAC. The First System controller's 44 MAC should be located on the same port with the System controller's 44 MAC.

Sorting Algorithm
System controller 44 picks a random camera unit 16 in a middle of the discovered route.
System controller 44 moves all camera unit 16 of the route on either side of the selected camera unit 16 based on a MAC location in the selected camera unit 16 MAC table. For example: camera unit 16 that appeared on port 0 are moved to the left of the selected camera unit 16, and the rest are moved to the right. The selected camera unit 16 becomes "top" of the two branch tree.
System controller 44 chooses right branch first and walks through the camera unit 16 applying a sliding window of three camera unit 16 including the top camera unit 16. System Controller 44 arranges the three camera unit 16 between each other.
System controller 44 slides the window down by one camera unit 16 and performs arrangement again until the bottom is reached.
System controller 44 slides the window again from the top until no camera unit 16 are shifted in this branch.
The left branch is sorted the same way. This can be done in parallel with the right branch in two separate threads. Sorting of the branches is an independent task.
System controller 44 builds routes for remaining end camera units 16 and repeats sorting for each branch.
Every time routes cross on a camera unit 16, system controller 44 marks camera unit 16 as joint camera unit 16.
At the end we've got a sorted tree which can have any number of branches and cross-branches.

3. Ethernet Sorting V2—Camera Unit 16 Initiated Topology Discovery

This sorting method includes a requirement that the network avoid branching, and that each string of camera units 16 exists on a single router entry. This method invokes two components: TDD: Topology Discovery Daemon—a program running constantly in the background on the ARM processor of each camera unit 16, and a SensorIdentity library which is called on demand by the main application running on the camera unit 16 to find out its location at any time. The TDD daemon's main responsibility is to refresh all MAC tables in the string.

TDD is called by a watchdog agent on the TDD's camera unit 16 every 30 seconds.

TDD checks if its camera unit 16 is the last camera unit 16 in the string. TDD gets MAC table from the camera unit 16 Ethernet Switch and checks if there are no camera unit 16 MAC entries on one of the ports.

If the TDD's camera unit 16 determines that it is the last camera unit 16 in the string:

TDD gets broadcast address from socket control functions.

TDD sends ping for a single packet on the broadcast address. This ensures that each camera unit 16 in the string receives the ping packet and that the MAC table of the Ethernet switch of each camera unit 16 in the string gets populated.

TDD exits.

SensorIdentity library is called by the main application running on the camera unit 16 to get its location ID in real-time. SensorIdentity library performs the following actions:

Gets gateway address from network tools (socket control functions)

Finds MAC address of a gateway by ARPing the address.

Finds which port of the MAC table includes the gateway MAC.

Calculates the number of camera unit 16 on the same port.

The camera unit 16 location ID is the calculated number+1.

Vehicle and Event Detection Algorithms

In one embodiment, the car detection algorithms run inside each camera unit 16, and work even if the connection to the row controller 42 is missing. Periodically, for example several times a second, an image is captured by the internal CMOS sensor of the camera unit 16 and is transmitted to the SDRAM 54 of the unit 16. ARM processor 52 in unit 16 then examines the image, calculating several metrics based on the content of the current image. These metrics are fed into a classification routine which has been previously trained on several thousand car and empty space images. The output of this classifier determines if a car is in the space 15 or not. Based on the values of the metrics, different types of vehicles and objects can be determined. Any classification routine or machine learning algorithm can be used; some common algorithms in the literature include Classification and Regression Trees, Support Vector Machines, and Artificial Neural Networks.

In one extension to the method described above, the metrics that are computed can themselves be learned from training data, using a variety of methods known in the art such as Kernel Methods, Principal Components Analysis, Independent Component Analysis, Feature Detection Methods, etc.

In a second extension, the determination of parking space occupancy can take into account time and historical activity. For example, using methods of background modeling, the detection routine can learn a model of the empty space over time and compare new images to the learned model to determine if a vehicle has entered or exited. Another implementation could use a change detection algorithm to determine when an event has occurred in the parking space (i.e. a car has entered or departed), by computing a running average or variance of the image or some other aspect or aspects of the image, and comparing the aspect of the image to the same aspect of each other image frame.

In a third extension, both of the above methods could be combined to provide a more accurate and robust method to detect vehicles in the parking space. For example, the output of the classifier could be used as feedback for the modeling routine to refine or prune its model. This could be further refined by using the "confidence" value of the classification output. In addition, the change detector could be used to bias the decision, depending on the current state. Moreover, the combination of methods can be tuned to trade off between false alarms (saying the space is occupied when it is really empty) and misses (saying the space is empty when it is really occupied), depending on the operator's preference.

In a fourth extension, a complete time- and history-dependent Markov model of the parking space can be constructed and updated in real-time. For example, at each time step (usually the acquisition time of a single image), the likelihood of the space being occupied is a function of the previous state, the current image metrics, the previous n image metrics, and the current time. This function can be optimized offline from training images, or can be learned and updated in real time.

The decision space of any or all of these algorithms can be expanded to include other events or characteristics to be detected, such as vehicle make, model, class, and color, as well as security events such as suspicious activity and physical violence.

License Plate Detection Algorithm

License plate detection by a camera unit 16 occurs in two stages. First, the image patch containing the license plate can be found using a variety of methods, such as template matching, or edge detection, looking for rectangular edges in the image and finding the most likely candidates for a license plate, based on the relative location and aspect ratio of the license plate. The license plate image is then processed by an Optical Character Recognition (OCR) routine that determines the values of the text and symbols contained in the license plate. This information is then transferred to system controller 44 (directly, or via the row controller 42) for storage and use.

In alternative embodiments, any or all of these algorithms run in the row controllers 42, in the system controller 44, or in the Ethernet level, or in a combination thereof. For example, in one such embodiment a camera unit 16 detects a vehicle entering a parking space and notifies system controller 44. System Controller 44 then requests a high resolution image from that camera unit 16. When system controller 44 receives the image from the camera unit 16, system controller 44 processes the image to extract the license plate image and presents the extracted license plate image to an OCR module for text extraction.

Additional Features

Find Your Car Feature

The system captures and analyses license plates and their location to the individual spaces 15 in parking lot 10. A customers enters his/her license plate number at the one of the entry kiosks 20 or 21, to locate the exact space at which the vehicle is parked. FIG. 5 shows exemplary screen captures, from the display screen of an entry kiosk such as entry kiosks 20 and 21, of the process. The customer may either key in the license plate number, make or color of car. Alternately, in an embodiment in which a camera similar to camera 50 in the relevant entry kiosk 20 or 21 captured the customer's license plate number when the customer's vehicle entered parking lot 10 and encoded the license plate number in the access ticket issued by the entry kiosk, the customer inserts the access ticket into the entry kiosk, which reads the encoded license plate number. System controller 44 then compares the information entered or encoded on the access ticket to its database of vehicles currently parked in the lot, and returns a picture of the most likely match, along with any other partial matches, as shown in the left screen capture of FIG. 5. The customer can then visually inspect and confirm the image. The kiosk then displays and/or prints a map with the route to the corresponding parking space, as shown in the right screen capture of FIG. 5. FIG. 11 shows a flowchart of this embodiment of the "find your car" feature.

Figure 12:
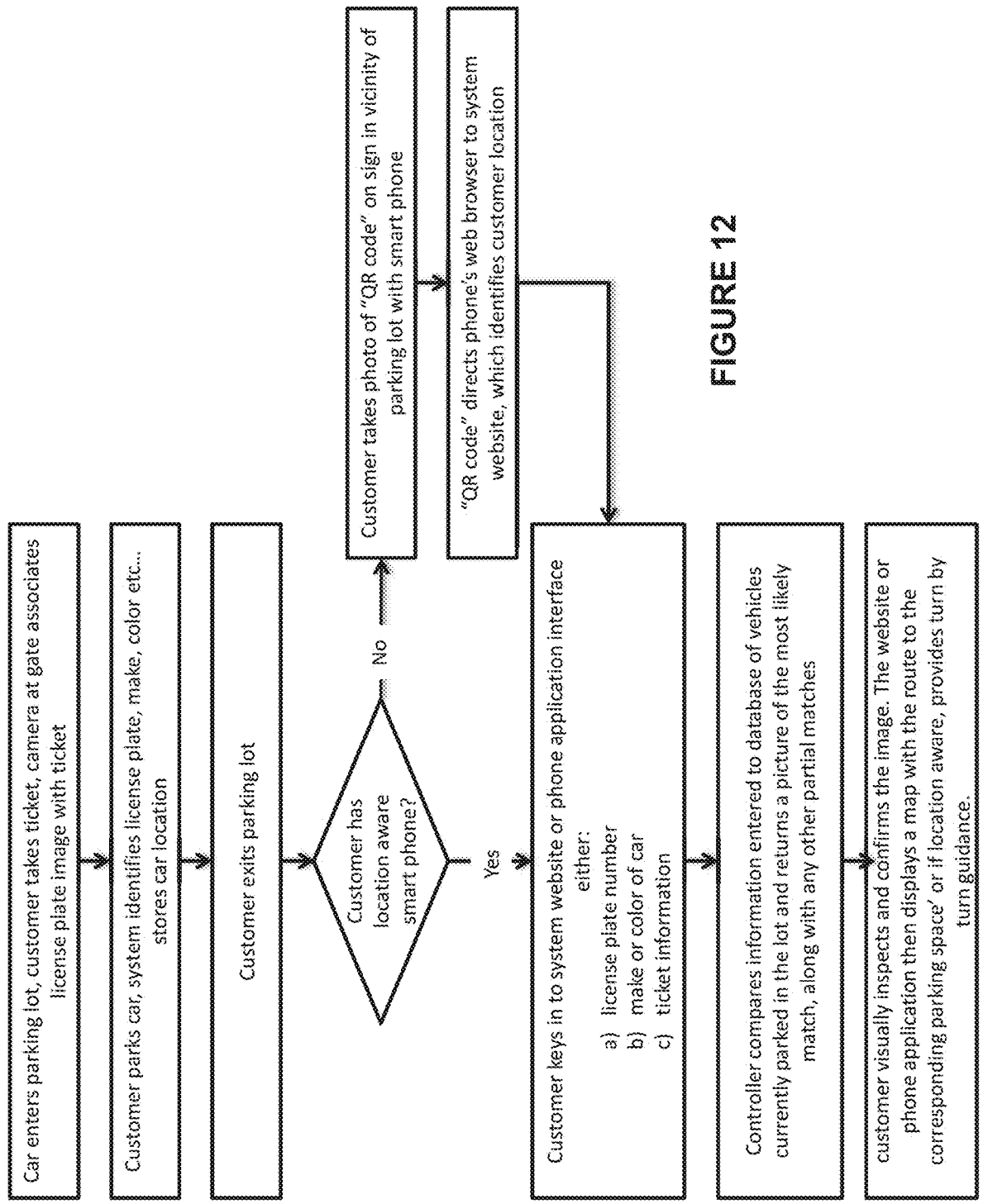

In an alternative embodiment, the customer may use his/her smart phone or similar mobile device instead of a kiosk. For example, the customer could take a picture of a "QR code" printed on a sign near the parking lot, which will direct the phone's web browser to a website where the customer can enter the vehicle information as in the kiosk method. Each QR code can be associated with a specific spatial location, allowing the system to compute a route from the customer's specific location. FIG. 12 shows a flowchart of the alternative embodiment of the "find your car" feature.

Figure 6:
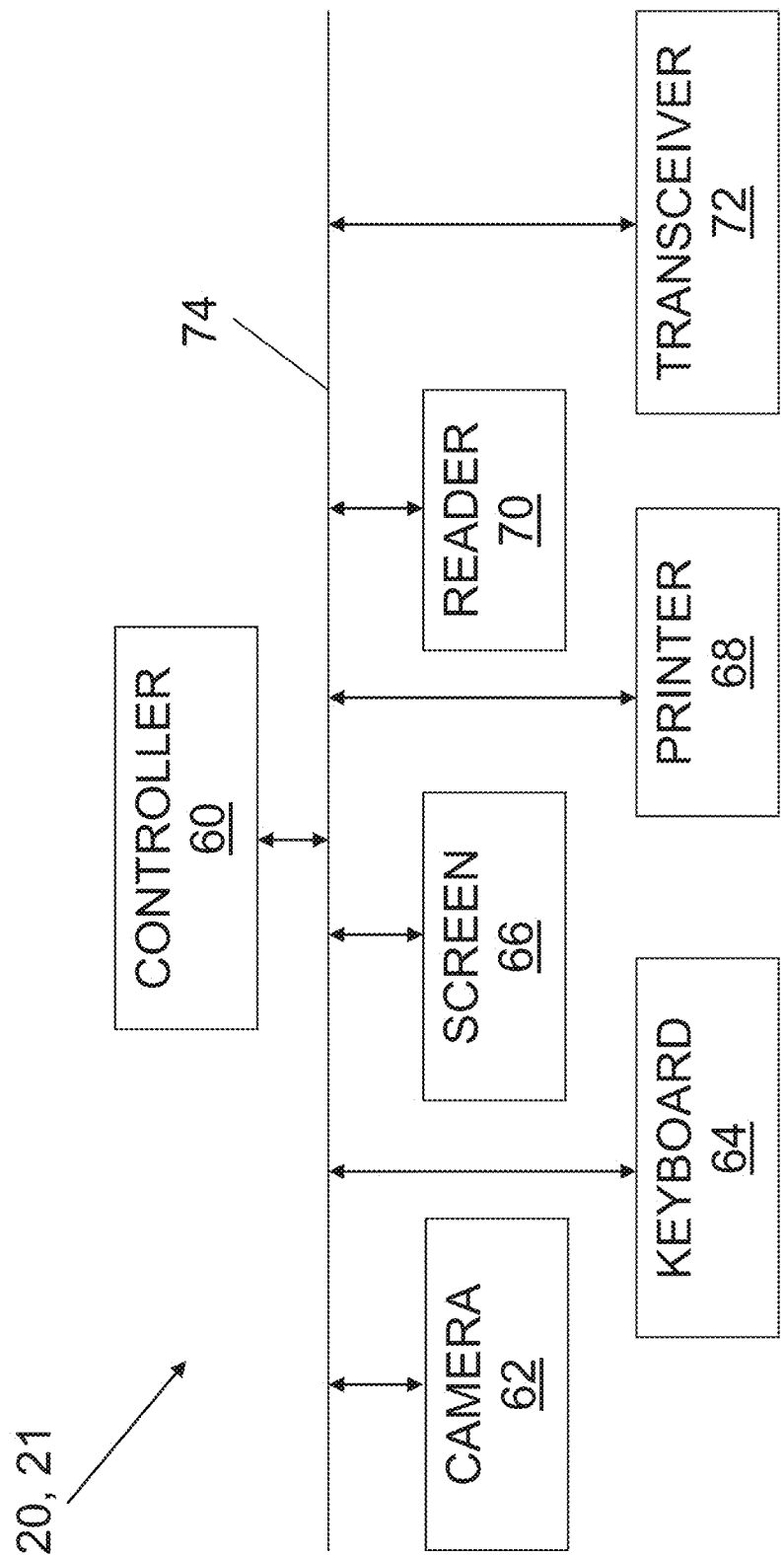
FIG. 6 is a partial block diagram of an entry kiosk of FIG. 1.

FIG. 6 is a partial high-level functional diagram of entry kiosk 20 or 21, showing the functional elements of entry kiosk 20 and 21 that may be needed for the "find your car" feature. Kiosk 20 or 21 includes a camera 62, similar to camera 50, for capturing identification images of vehicles entering parking lot 10, a keyboard 64 at which a customer types the license plate number of his/her vehicle, a display screen 66 for displaying responses such as shown in FIG. 5 in response to the customer's inquiry, a printer 68 for printing access tickets, a reader 70 for reading access tickets and a transceiver 72 for communicating with customers' mobile devices. Components 62, 64, 66, 68, 70 and 72 are under the control of an entry kiosk controller 60 via a bus 74.

In another embodiment, the customer's smart phone location-awareness can be used to compute a route to the parking space from the customer's current location. With a precise location-aware system, such as a location-aware system based on WiFi time-difference-of-arrival, the customer can be directed with turn-by-turn directions, or through an updating, homing-beacon process.

Tiered Parking Control

Under the tired parking control scheme, the cost of parking varies depending on the location of each individual parking space 15. The present invention records the license plate of a vehicle on entrance to the car park, using a camera in the relevant entry kiosk 20 or 21, and reconciles the ticket with the license plate number captured at the individual parking space 15 by camera unit 16. Alternatively, the individual space number is reconciled with the license plate under a pay by space format. Finally, the customer may attach a prepayment to the customer's license plate number, and the system can automatically bill the customer for the exact space the customer parks in. This method allows billing of customers for use of a specific parking space at a specific time without requiring any form of physical access control such as barrier gates, ticket or credit card payment terminals. Following reconciliation on system back-end software, a tariff is charged based on the location of the parking space at the automated pay station of the garage. This enables differential pricing to be efficiently varied based on the location, type or demand down to the individual space of the car park. Alternately, this could be varied by amount of time spent in car park, number of previous times a vehicle has been parked, etc.

Permit Parking Control

Detection algorithms in the system software are capable of identifying permit badges to ensure that parking spaces that are allocated for permit use are occupied by authorised permit holder only. If a permit is not displayed, the system takes a picture of the vehicle for infringement processing. Parking garage management need no longer allocate a nested staff area; simply create a designated area and staff will be notified if they park outside this area. In an alternative embodiment, permit parking can be allocated by license plate, or unique combination of vehicle make, model, color, and other identifying marks.

Parking Lot Lighting and Ventilation System Efficiency Enhancement

Since the system of the present invention enables all parking slots 15 to be surveyed in real time, illumination of slots and driveways can be controlled according to real time usage of each parking space 15. As a result, lighting levels can be changed for individual spaces, zones or floors, e.g. via differential control of lighting fixtures 24, leading to energy power savings. Furthermore, the same is true for ventilation systems whose power output and usage levels can automatically be adjusted based on individual parking space 15 utilization e.g. via differential control of ventilation vents 23.

Customer "Profiling"

Different types of cars may correlate to different types of fee structures. Furthermore, different types of vehicles, such as hybrids, vehicles with permits, or vehicles subject to manufacture promotions, may be allowed to park in individual spaces 15 at a discount or premium. The detection algorithms are able to correlate the type of car to the promotion, discount or incentive. Furthermore, vehicle identification can be linked to customer loyalty rewards programs, allowing operators to provide shopping incentives at the point of parking. More details of such loyalty programs are provided below.

Enforcement

The system can track in real time whether a particular parking space 15 is correctly occupied, for every parking space 15, 24 hours a day. If a vehicle stays longer than the proscribed length of time, enforcement action can be taken automatically using vehicle identification information (e.g. license plate) or manually by alerting enforcement personnel. Other infractions to parking rules and regulations, such as a single vehicle occupying more than one space 15, can also be detected and acted upon.

Object Type Detection

Via image processing algorithms run either in camera units 16 or in row controllers 42 or in system controller 44, the system can monitor the type of object that is parked in a space 15. This can identify the make and model of a vehicle, and also tell if the item parked in the space 15 is a motorcycle, parking cart or a person. This can be used to notify the parking lot manager that the parking cart needs to be removed, that someone is loitering in the parking lot, or other such uses.

Security

The image processing algorithms are capable of detecting other types of events, including suspicious activity that might indicate a theft in progress or a physical attack on a customer. This information can be sent to security personnel for immediate action, thereby improving the accuracy and coverage of existing closed circuit camera systems and other security measures already in place.

Remote Monitoring and Control

System controller 44 can be connected to the Internet, as shown in FIG. 2, enabling a large-scale system fix real-time monitoring and control of any parking lot 10 from anywhere in the world. This can be achieved through a client-server architecture that combines software running on a remote computer, Internet-based communications, and server software running on system controller 44. In the following discussion, the term "server" refers to server software running on system controller 44. This remote monitoring system can be used for the following purposes:

- Remote monitoring of parking spaces 15 for security and enforcement
- To improve the accuracy of the automatic detection through human intervention
- As an input to the automatic detection algorithm, to refine the computer vision models by correcting errors and providing new labeled data parking lot manager selects one or more zones that s/he wishes to monitor. A zone is a group of bays 15, usually an entire level of parking spaces.

Every 10 seconds, a periodic task running in the web browser client queries a JSON webservice on the system controller 44 that returns the list of all bays 15 in the selected zones. The response includes a timestamp of each of the server's thumbnails. If the client's copy of the thumbnail is out of date (or it has never been downloaded) the client downloads the thumbnail from the server and inserts the thumbnail onto the page.

The page is split into 4 buckets. In each bucket, there is a grid of the thumbnails belonging to that category. The manager can click on any images associated with incorrect detection decisions to toggle the override mode of a camera unit 16. If the camera unit 16 is in automatic mode, a mouse click threes it to the opposite detection decision. If the camera unit 16 has been forced into an overridden state, a mouse click puts the camera unit 16 back into automatic mode. Based on its next detection decision, the camera unit 16 will go to the VACANT or OCCUPIED state in automatic mode.

The following table shows how the manager corrects erroneous detection decisions.

| State | New State | Why the user should click |
|---|---|---|
| VACANT in automatic detection mode | FORCE_OCCUPIED | There is a vehicle visible in the image that was not being detected by the algorithm |
| FORCE_VACANT (override active) | Automatic mode | There is a vehicle visible and the camera module 16 had been forced into a vacant mode. The click puts the camera module 16 into automatic mode and it goes into VACANT or OCCUPIED in automatic mode based on the outcome of the detection algorithm's decision |
| OCCUPIED in automatic detection mode | FORCE_VACANT | There is no vehicle in the image, and it is being detected as occupied by the algorithm |
| FORCE_OCCUPIED | Automatic mode | There is no vehicle in the image but the camera module 16 had been forced into a OCCUPIED mode. The click puts the camera module 16 into automatic mode and goes into VACANT or OCCUPIED in automatic mode based on the outcome of the detection algorithm's decision |

To identify system faults such as broken cameras 50, 62 and take corrective action.

Figure 7:
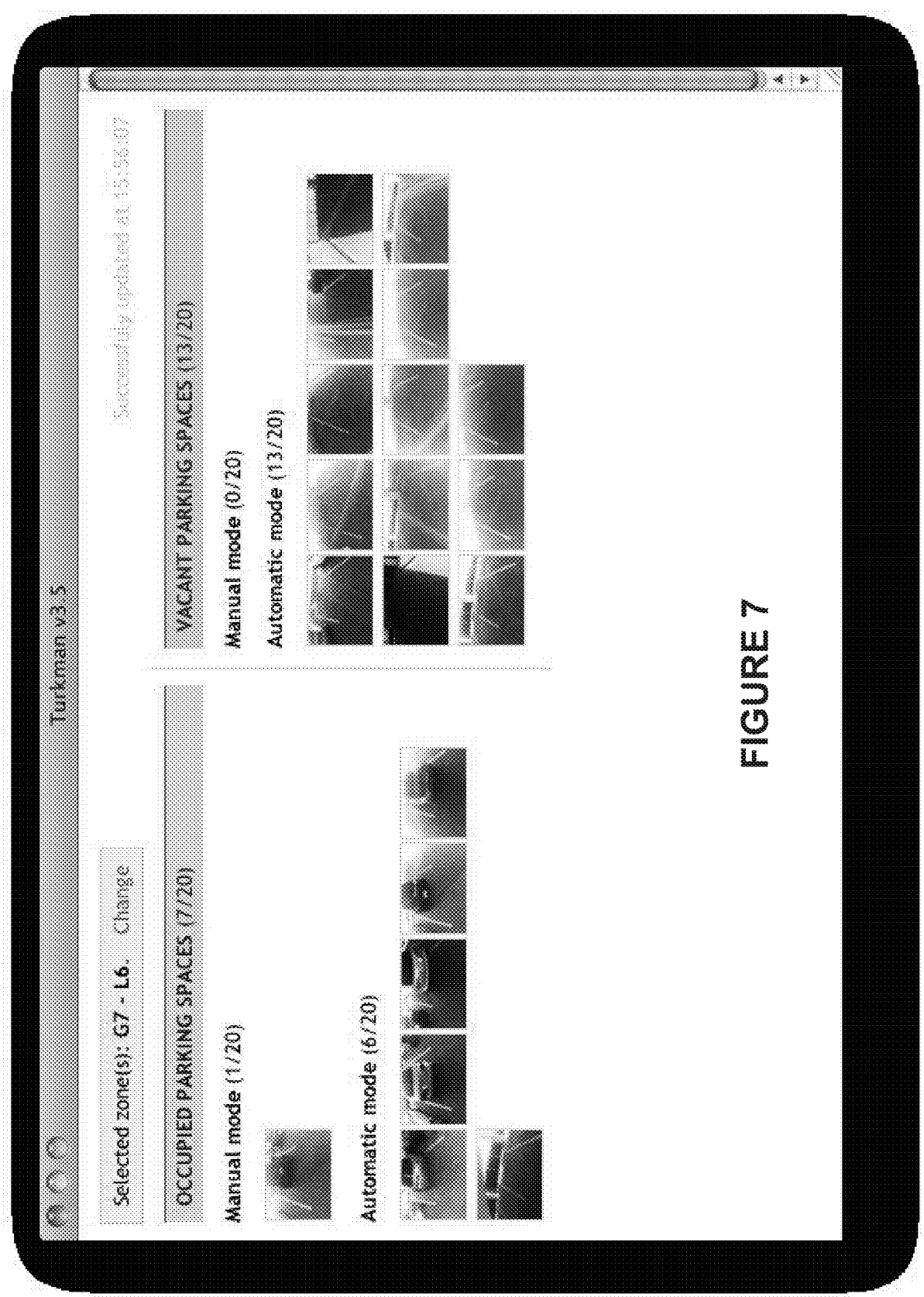
FIGS. 7 and 8 shows web page user interfaces for manual tuning of the automatic vehicle detection algorithm.

In one embodiment of this system, system controller 44 keeps a copy of a thumbnail image from each camera 50 on the site. When any of the following three actions are triggered, system controller 44 requests an image from the associated camera unit 16 and places it into a server-side cache located on the system controller 44:

a) The camera module 16 notifies the system controller 44 that an entry/exit was detected by sending a Visit Event
b) The camera module 16 notifies the server that camera module 16 image has changed by sending a Change Detected Event
c) The system controller 44 cached copy of the thumbnail s greater than 10 minutes old The parking lot manager interfaces with the system through a web browser, opened to a web page that is served up by system controller 44 using a combination of HTML and JavaScript. An example of the web page user interface is shown in FIG. 7. In this overview monitoring system, the Of course, such correction of erroneous detection decisions also can be done locally, directly at system controller 44.

The decision space of the grid can be expanded to allow error correction and model update for other types of decisions, such as vehicle make, color, vandalism, etc.

Figure 8:

In an alternate embodiment, the system is further optimized for allowing human intervention for correcting errors and updating models, either off-line or in real-time. In this case, human intervention to correct detection mistakes and label data takes the form of a simple web-based game, as depicted in FIG. 8. The human operator is presented with two grids of up to 9 images each. In the grid on the left, thumbnails are displayed of bays 15 that the vision algorithms have labelled as being occupied. Similarly, on the right are thumbnails of bays 15 that the algorithm has labelled as vacant. The human operator must click on any mislabeled data on the screen before submitting the changes to the server. A 30 second timer and the tracking of how many corrections have been made can be used to incentivize the operator to make many corrections as fast as s/he can.

Figure 9:
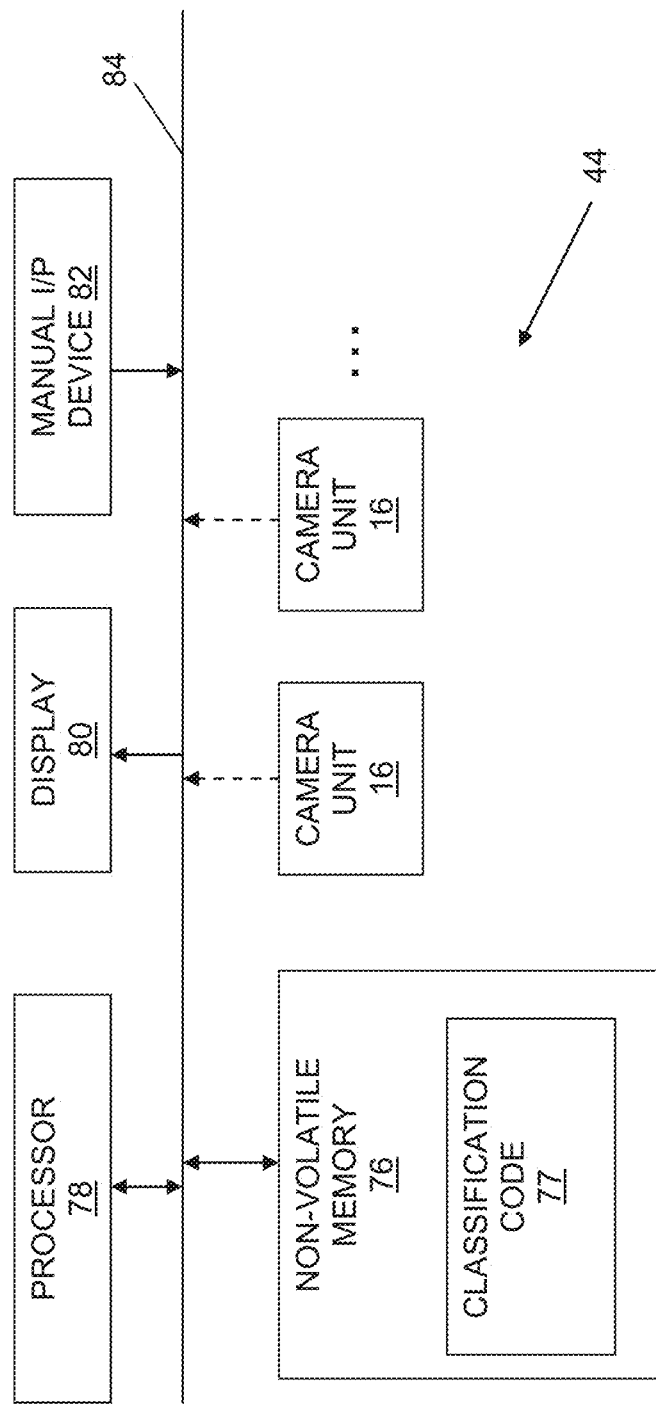
FIG. 9 is a partial block diagram of a system controller that is configured to support interactive correction of automatic occupancy detection.

As this preferably is a distributed system allowing many simultaneous operators to label the data, the server must decide which images are being allocated to users. The server maintains a priority queue, and a client request for images returns a block of images with the highest priority. These images are immediately removed from the priority queue to ensure that each user is getting a unique set of images. Each of the following criteria adds to the image's priority score, with the highest scores denoting the images with the highest priority:
1. The camera module 16 detected a significant change in its image
2. The camera module 16 is currently overridden
3. This parking space has previously been marked as incorrect (for spaces with recurring errors)
4. The algorithm's detection confidence is low
5. This space has not been 'watched' for more than 20 minutes FIG. 9 is a high-level partial block diagram of an embodiment of a system controller 44 that is configured to support such interactive correction of the parking space occupancy detection algorithm. This system controller 44 includes a non-volatile memory 76 such as a hard disk or a flash disk, a processor 78, a display device 80 such as a display screen, and a manual input device 82 such as a keyboard or a mouse, all communicating with each other via a bus 84. This system controller 44 also is coupled, usually indirectly (as indicated by the dashed arrows), to camera units 16 to receive occupancy images of parking spaces 15. Non-volatile memory 76 is used to store executable code 77 for classifying the occupancy images as occupied or vacant, for displaying these classifications on display device 80, for receiving corrections of these classifications via manual input device 82, and for modifying the classification algorithm in response to the corrections to make the classification algorithm more accurate, as described above.

Non-volatile memory 76 is an example of a computer-readable storage medium bearing code for classifying occupancy images, for interactively correcting these classifications and for modifying the classification algorithm.

Efficient Mapping of Sensor Locations

To enable any method that requires knowledge of the location in a parking lot 10 of a specific parking space 15, we need a method for mapping each camera unit 16 to the specific parking bay or bays 15 that the camera unit 16 monitors. The naïve approach is to manually record the unique address (MAC, IP, etc.) of the corresponding camera unit 16 for each bay 15, along with the bay's unique number. These numbers can be linked and cross-referenced in a table or a database. In addition, the bay locations can be manually marked on a map image of parking lot 10, for use in helping customers find their cars, or for providing a pictorial view of the parking lot occupancy status to the parking lot manager. Unfortunately, the process of manually recording and associating parking bays 15 with camera units 16 is extremely time consuming, costly, and error prone. Moreover, if the physical layout changes at any time during the life of the system—for example, if a camera unit 16 is replaced, or if the bay locations are changed—the associations must be manually updated to ensure the mappings remain accurate.

A better method is to use automatic discovery of the network topology to simplify the process of mapping bays 15 to camera units 16 in software. The system of the present invention can use any of a number of automatic topology discovery algorithms to identify and map the topology of the network of camera units 16, including the Packet Decoding Method described above for serial communications, the Server initiated Topology Discovery and Sorting Algorithm described above for Ethernet communications, the Sensor Initiated Topology Discovery Algorithm described above for Ethernet communications, or any of a number of protocols known in the art, such as the Spanning Tree algorithm used by the Simple Network Management Protocol (Internet Engineering Task Force RFC 3411—An Architecture for Describing Simple Network Management Protocol (SNMP) Management Frameworks).

Figure 10A:
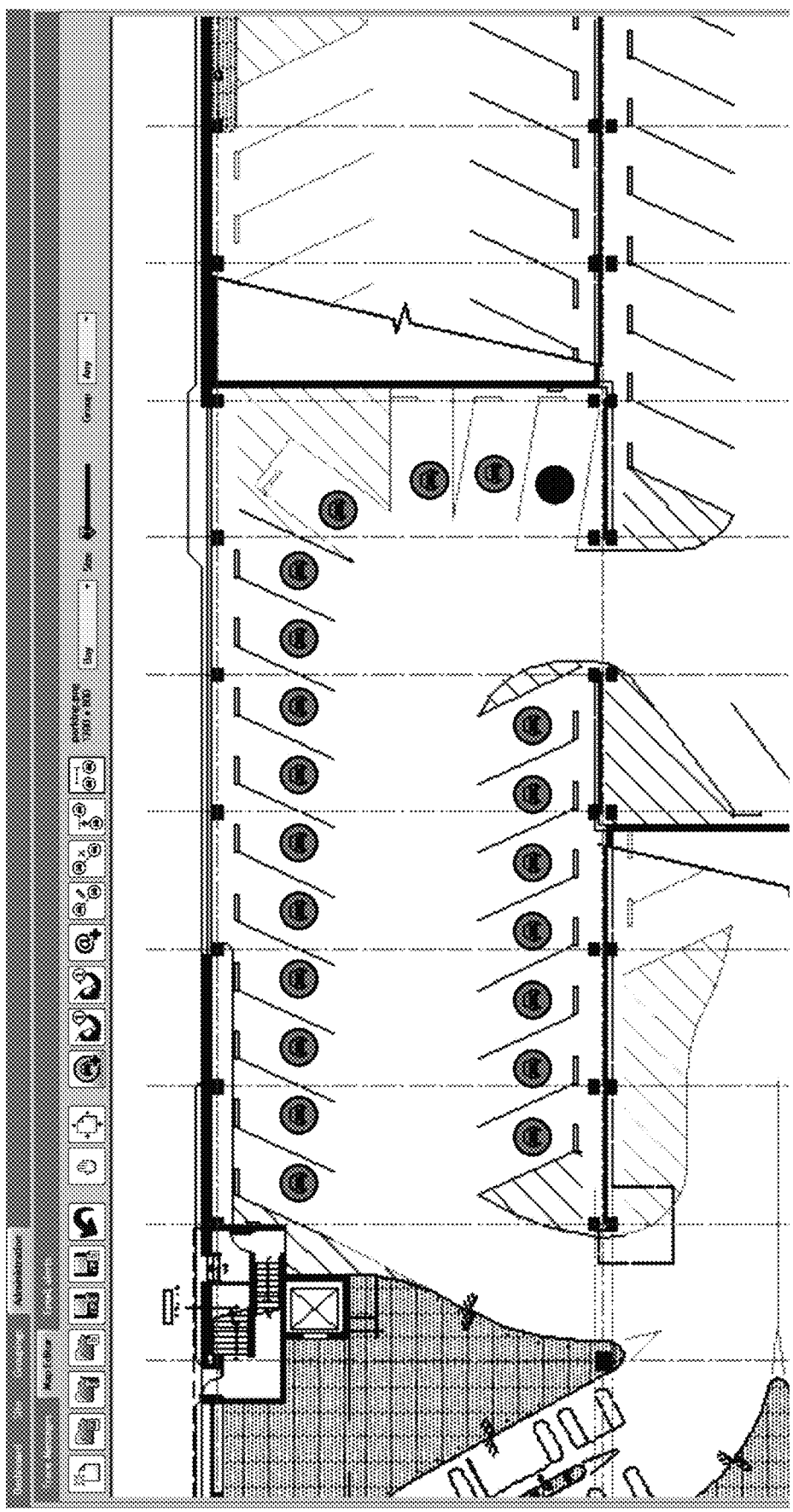
FIGS. 10A-10D illustrate mapping of camera units to their locations following camera unit network topology discovery.
Figure 10B:
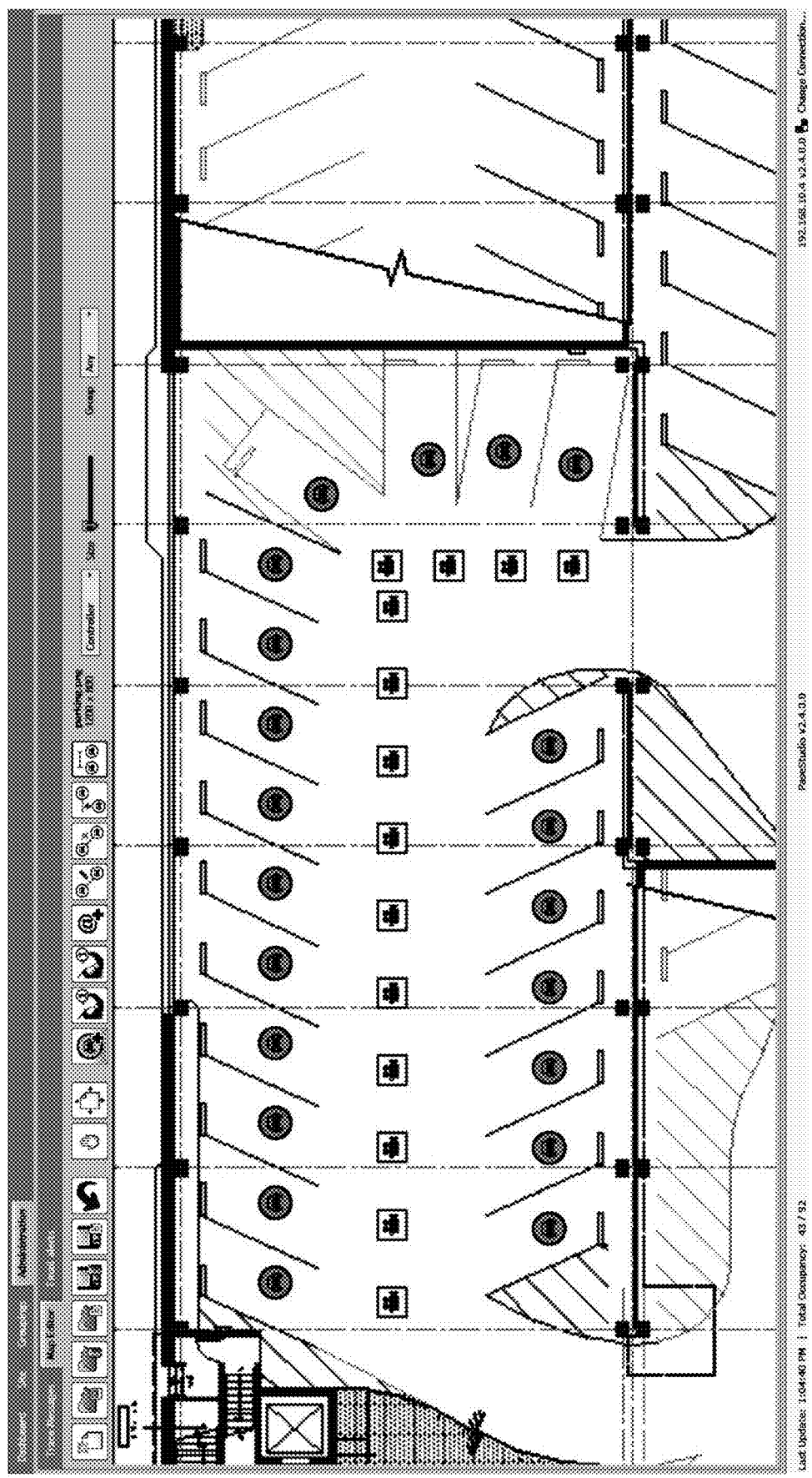
Figure 10C:
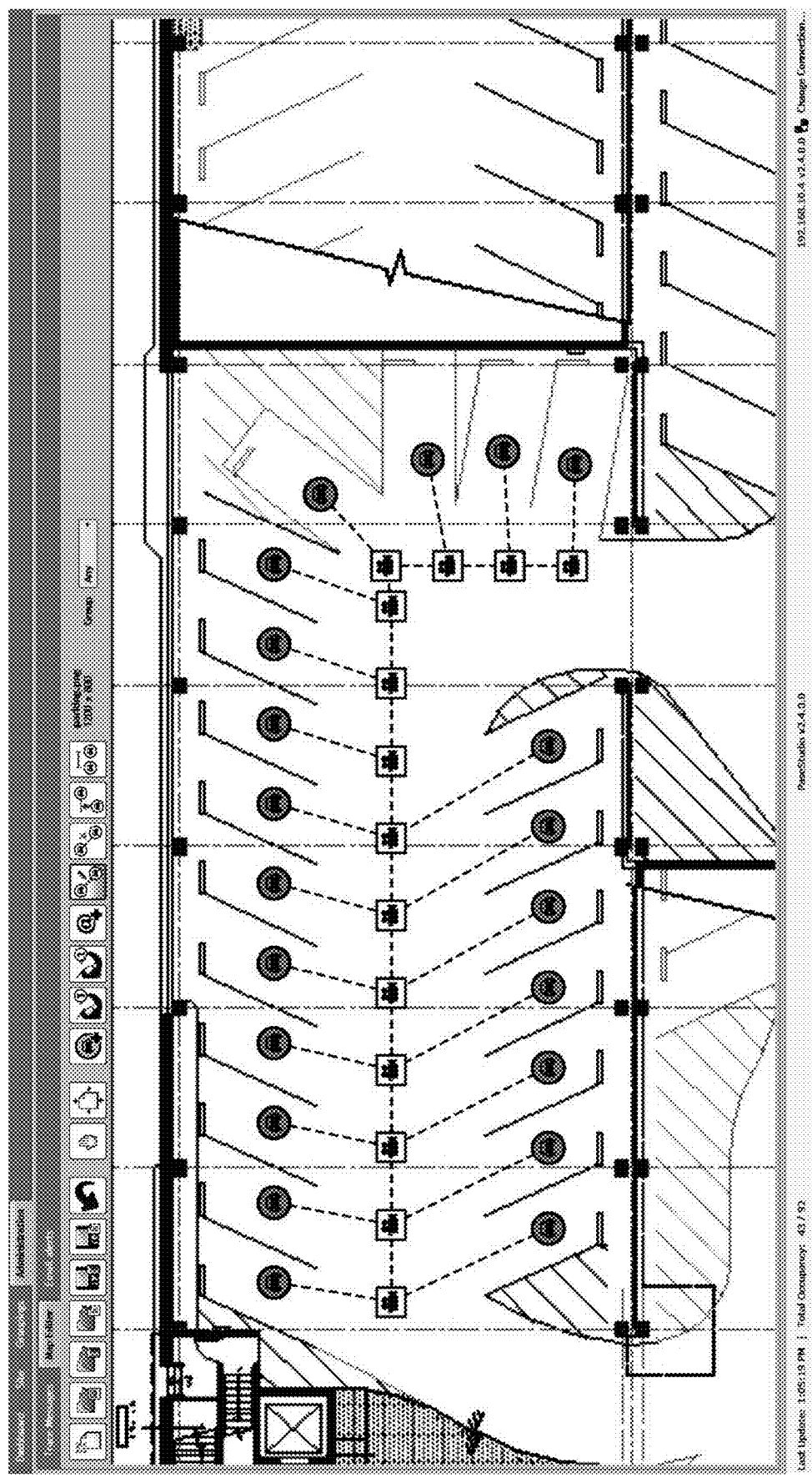
Figure 10D:
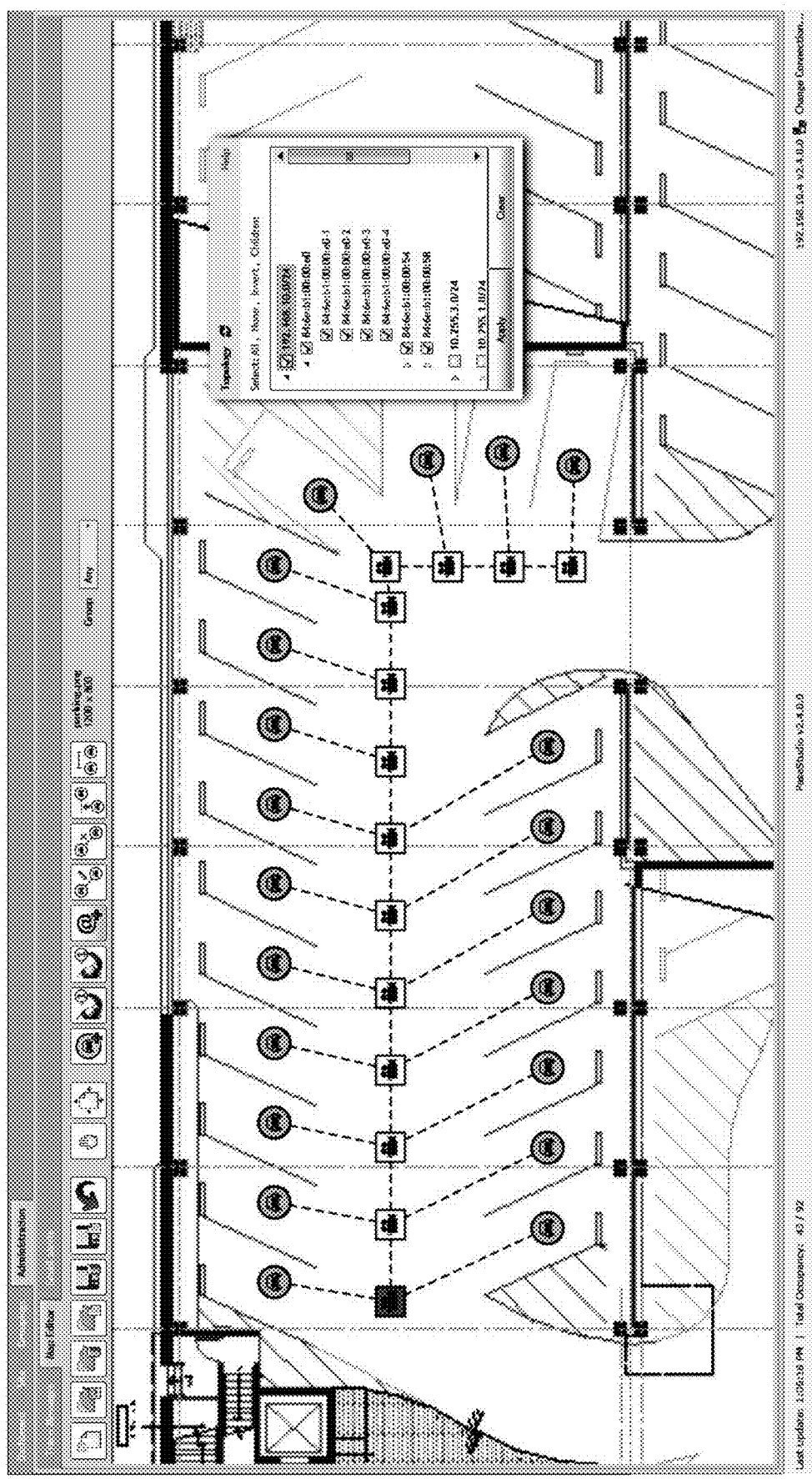

Once the network topology is known, mapping bays 15 in a map image and associating them with camera units 16 is simply a matter of associating just one camera unit 16 of each string of camera units, as recorded in the network topology, with the intended map coordinates of that camera unit 16 and of the bay(s) 15 that that camera unit 16 monitors. Because system controller 44 knows the network topology and also knows the map coordinates of all camera units 16 and of all the other bays 15, system controller 44 can associate all the remaining camera units 16 with their respective map coordinates and with the map coordinates of the bays that those camera units monitor. FIGS. 10A-10D are screen captures of a graphical user interface (GUI) that illustrate how this can be done simply in a single step, as follows:
1. User loads a map image of the parking lot, such as an engineering plan or other pictorial of the parking lot layout, into the GUI.
2. User marks the locations of the parking bays 15 by placing "bay pushpins" at the appropriate places in the image, as illustrated in FIG. 10A. The software automatically saves the relative x- and y-coordinates in the image for each bay pushpin.
3. User marks the locations of camera units 16 by placing "camera pushpins" at the appropriate places in the image, as illustrated in FIG. 10B. The software automatically saves the relative x- and y-coordinates in the image for each camera pushpin. Note that at this point the system knows the map coordinates of camera units 16 but does not yet know which camera unit 16 goes with which map coordinates.
4. User associates each bay pushpin with a camera pushpin by drawing a line from the bay pushpin to the camera pushpin, as illustrated in FIG. 10C. A camera pushpin can be linked to multiple bay pushpins, but each bay pushpin can only be linked to a single camera pushpin.
5. User links the camera pushpins in a string by drawing a line to connect them, as illustrated in FIG. 10C. A camera string corresponds to a physical string of camera units 16 daisy-chained together. A camera string begins at a "root node" attached directly to a row controller or an IP network switch, and terminates at an "end node" which is a camera unit 16 that has one empty communications port (either Serial or Ethernet switch).
6. User opens the Topology Discovery Tool window and finds the appropriate camera string, identified by the IP address of the row controller or Ethernet switch attached to its root node, as illustrated in FIG. 10D.
7. User selects the camera pushpin corresponding to the camera string's root node (this pushpin is shaded in FIG. 10D), and presses Apply in the Topology Discovery Tool window. The software automatically links and cross-references the camera pushpins along the camera string with the physical MAC addresses of the camera units 16, in order, according to the discovered network topology.

8. The user repeats this process for every physical string of camera units 16 in the parking lot.
9. If a camera unit 16 is ever replaced, the system can detect a change in the topology and automatically update the mapping to reflect the new change without requiring user intervention.
10. If bays 15 are ever moved or reconfigured or added or removed, or if camera units 16 are added or removed, the user can easily detect and correct the change using the GUI.

FIG. 9 serves to illustrate a system controller 44 configured to map the locations of camera units 16 as described above, provided that executable code 77 is understood as executable code for implementing the mapping of the locations of camera units 16 as described above. Non-volatile memory 76 then is an example of a computer-readable is storage medium bearing code for mapping the locations of camera units 16 as described above.

Loyalty Programs

The information collected by the system can be used to enhance customer loyalty and shopping incentive programs by identifying customers automatically as soon as they park their car and notifying the customers and/or the merchants and/or the parking lot manager of qualifying loyalty rewards, shopping incentives, discounts, and other targeted programs Customers can be notified directly in the parking space 15, or at any point between the garage entrance 30, 31 and the parking space 15, or at any point between the parking space 15 and the customer's ultimate destination such as a store, restaurant, or shopping area. Advertising can be in the form of audio and or visual signals, presented through one or more audio speakers and/or one or more video displays that are integrated with the system or that can communicate with system controller 44, and/or with row controllers 42, and/or with camera units 16. This can be achieved as follows:
1. Customer parks car in a parking space 15.
2/ A camera unit 16 detects a car and sends an image of the car to system controller 44.
3. System controller 44 extracts the license plate number from image acquired by camera unit 16 and compares the ex acted license plate number to a database maintained either on system controller 44 or on a server co-located on a network such as the Internet. Alternatively, the license plate could be extracted directly on the camera unit 16 and sent to system controller 44.
4. If a user record is found matching the recorded license plate, system controller 44 triggers a loyalty program event, which can include any or all of the following:
   a. Offer audio and/or visual advertisements and/or shopping incentives and/or other loyalty rewards directly to the customer in the parking space 15, through a speaker and/or video panel integrated into the camera unit 16 or external to it.
   b. Send advertisements and/or shopping incentives and/or notification of other loyalty rewards directly to the customer via mobile phone.
   c. Link discounts and other point-of-sale offers directly to the customer's loyalty account, which will be applied at point-of-sale when the customer uses his/her loyalty program card or a credit card associated with the account.
   d. Notify stores in the shopping area that the customer is on-site, allowing the stores to offer qualified incentives, advertisements, and discounts directly to the customer.

Advertising

The information collected by the system can be used to target advertising to specific demographics as soon as a customer parks his/her car. This can be done even without the use of license plate recognition and/or without consulting a user database, by examining demographic information such as make and model and color of the vehicle, license plate design, and other identifying marks such as bumper stickers and sports team insignias. Advertising can be presented to the customer directly in the parking space 15, or at any point between the garage entrance 30, 31 and the parking space 15, or at any point between the parking space 15 and the customer's ultimate destination such as a store, restaurant, or shopping area. Advertising can be in the form of audio and or visual signals, presented through one or more audio speakers and/or one or more video displays that are integrated with the system or that can communicate with system controller 44, and/or with row controllers 42, and/or with camera units 16. This can be achieved as follows:
1. Customer parks car in a parking space 15.
2. A camera unit 16 detects a car and sends an image of the car to system controller 44.
3. System controller 44 extracts from the image anonymous demographic information such as: make/model/color of vehicle, license plate information, symbols and bumper stickers (such as sports teams, university, political affiliation, etc.). Alternatively, this information could be extracted directly in the camera unit 16 and sent to system controller 44.
4. If demographic information is found, system controller 44 can offer audio and/or visual targeted advertisements directly to the customer in the parking space 15, through a speaker and/or video panel integrated into the camera unit 16 or external to it.

Valet Parking

The system can be used to simplify the process of valet parking for the valet operator, and enhance the valet parking experience for the customer. This can be achieved as follows:
1. Customer arrives at valet stand, receives a ticket with a unique i.d. number on it. Number can also be encoded in a bar code or QR code.
2. Valet parks car in a parking space 15.
3. A camera unit 16 detects the car and sends an image of the car to system controller 44.
4. System controller 44 extracts the license plate number from the image and automatically associates the license plate number with the ticket i.d. number. Valet can also manually associate the license plate number with the ticket i.d. number using a terminal or handheld portable device, or using a bar code reader. The license plate number could also be extracted directly by the camera unit 16.
5. Customer can surf to a website at any time to see a live image of his/her car to ensure that the car is safe. The website can be accessed from any web browser or through a smart phone application, or the URL of the website can be encoded into the QR code so that the customer can simply scan the QR code with his/her smart phone to open up the website to the appropriate page. The customer can manually enter his/her license plate number to locate and view the live image of his/her car.
6. The customer can enter his/her phone number or email address through the website or through a phone application to be automatically notified if the car moves.
7. The customer can use the website or the phone application to alert Valet that s/he is returning, so the valet has the car ready when s/he returns.
8. The valet simply enters the ticket i.d. number into the terminal or into a handheld device, or scans the bar code, or enters the license plate number, and the system tells the valet which parking space number is associated with that record, and may even display a map so that the valet can easily locate the vehicle.

Renting Out Private Spaces

In a mixed-use (commercial+residential) facility, the system enables residents to rent out their spaces &when they aren't using them. This can both increase the effective capacity of a commercial parking garage, and provide a monetary incentive or subsidy to residents. This can be achieved as follows:
1. When a resident signs a lease or purchases a parking space or purchases a residential or commercial unit, s/he get an online account associated with his/her parking space(s) 15.
2. A resident can log on to an online system to access and manage his/her account.
3. A resident can configure his/her account with his/her license plate number, phone number, email address, and any other identifying information,
4. A resident can configure the system to automatically notify him/her if a car with an unknown license plate parks in his/her space 15.
5. A resident can opt-in to a system that allows his/her space 15 to be used by visitors to the commercial entities that share the parking lot 10. This can be 24 hours/day, or for fixed time periods and/or specified days of the week/month/year. This can also be configured in the online system, or by phone or at a kiosk or in person with the parking manager.
6. If a visitor parks in the resident's space 15 during the designated times, the resident either receives a percentage of the parking revenue, or a share of the facility's revenue calculated as a percentage of the revenue collected from the entire pool of shared private spaces. Money can be disbursed as a credit against rent, or directly as a deposit into the resident's bank account, check, money order, cash, PayPal™, etc.

Individual Security Monitoring

When parking a car, particularly in a public parking lot, safety and security of the vehicle is a major concern for many people. The system can be used to provide an extra measure of security by allowing customers to monitor their vehicles directly, as follows:
1. Customer loads a smart phone application, or navigates a web browser to a particular web site, or sends a text message to a particular phone number, and enters the unique identification number printed on the access ticket received upon entry to the parking lot 10.
2. System controller 44 receives request, queries its database for the vehicle record, and responds with a live or recent (e.g. within the past 5 minutes) image of the vehicle in the parking space 15.
3. Customer can configure the system, through the web site or phone application or via text message commands, to automatically alert the customer via text message and/or email if any of the following occurs:
    a. The image captured by camera unit 16 of parking space 15 has changed compared to a previously captured image; this could indicate an attempt to vandalize or break into the vehicle.
    b. The parking space 15 has become vacant; this could indicate a possible theft of the vehicle.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:
1. A method of managing a plurality of parking spaces, comprising:
    monitoring a parking space with a single imaging camera sensor capable of alternating between capturing an occupancy image and capturing a high resolution identity image, said monitoring effected by obtaining the occupancy image with said single imaging camera sensor of an imaging unit;
    detecting, by said imaging unit, occupancy or vacancy of said parking space by classifying said occupancy image;
    based on detecting vacancy of said parking space, providing the occupancy image to a graphical user interface of a human operator;
    receiving a change of status from the human operator for the parking space from the vacancy status to an occupied status; and
    in response to the change of status received from the human operator:
        sending a request to said imaging unit to capture the high resolution identity image of a vehicle occupying said parking space;
        capturing said high resolution identity image of said vehicle occupying said parking space, with said single imaging camera sensor;
        storing at least part of said high resolution identity image; and
        processing said high resolution identity image to extract a vehicle identifier of said vehicle from said high resolution identity image.
2. The method of claim 1, further comprising indicating a status by illuminating a corresponding color of a multicolor indicator, said multicolor indicator collocated with said single imaging camera sensor, said corresponding color predefined to indicate said status.
3. The method of claim 1, wherein said vehicle identifier includes at least one of: a license number of said vehicle or at least partial visual characterization of said vehicle.
4. The method of claim 1, wherein said monitoring of said parking space comprises:
    (i) obtaining multiple images per second; and
    (ii) running each of said multiple images through a classification algorithm to determine whether said parking space is occupied;
    wherein said detecting occupancy of said parking space includes recognizing, by said classification algorithm, occupancy of said parking space.

5. The method of claim 1, further comprising:
obtaining multiple images per second; and
running a change detection algorithm on said multiple images to determine whether an event has occurred in said parking space, said event selected from the group including: arrival of said vehicle in said parking space and departure of said vehicle from said parking space,
wherein said detecting occupancy of said parking space includes said change detection algorithm determining said arrival of said vehicle in said parking space.

6. A method of managing a plurality of parking spaces, comprising:
monitoring a parking space by obtaining a first type of image from an imaging camera sensor of an imaging unit;
determining occupancy or vacancy of said parking space by classifying said first type of image;
based on determining vacancy of said parking space, providing the first type of image to a graphical user interface of a human operator;
receiving a change of status from the human operator for the parking space from the vacancy status to an occupied status;
in response to the change of status received from the human operator:
obtaining, as a result of said parking space having said occupied status, a second type of image, said second type of image being a high resolution image of a vehicle occupying said parking space, said high resolution image obtained by same said imaging camera sensor;
storing at least part of said high resolution image; and
processing said high resolution image to extract a vehicle identifier of said vehicle from said high resolution image; and
in response to an inquiry, by a customer, that includes vehicle information entered in the form of one of a keyed in license plate number, a keyed in make or color of vehicle, or an encoded vehicle license plate number read from a receipt or access ticket issued to said customer, prior to parking said vehicle:
having a system controller compare said entered vehicle information to said vehicle identifier extracted from said high resolution image obtained by said imaging camera sensor, and
identifying a location of said parking space based on a known location of said imaging camera sensor which obtained said high resolution image.

7. The method of claim 1, further comprising:
in response to an inquiry, by a customer, that includes vehicle information entered in the form of one of a keyed in license plate number, a keyed in make or color of vehicle, or an encoded vehicle license plate number read from a receipt or access ticket issued to said customer:
having a system controller compare said entered vehicle information to said vehicle identifier extracted from said high resolution identity image obtained by said single imaging camera sensor,
identifying a location of said parking space based on a known location of said single imaging camera sensor which obtained said high resolution identity image, and
charging a differential tariff to said customer based on said location of said parking space in which said vehicle is parked,
wherein according to said differential tariff different individual parking spaces within the plurality of parking spaces are allowed to have different parking fees dependent on respective locations of said individual parking spaces.

8. The method of claim 1, wherein the change of status from the human operator for the parking space from the vacancy status to an occupied status occurs in real-time.

9. The method of claim 8, wherein the change of status from the human operator occurs within thirty seconds of the occupancy image being provided to the graphical user interface of the human operator.

10. The method of claim 1, further comprising:
based on detecting occupancy of said parking space, capturing said high resolution identity image of said vehicle occupying said parking space, with said single imaging camera sensor;
providing the high resolution identity image to the graphical user interface of the human operator; and
receiving a change of status from the human operator for the parking space from the occupied status to the vacancy status.

11. The method of claim 10, wherein the change of status from the human operator from the occupied status to the vacancy status occurs offline to correct detection mistakes.

12. The method of claim 7, further comprising:
directing said customer to said parking space, said directing includes issuing a plurality of navigation instructions to said customer.

* * * * *